US012561522B2

(12) United States Patent
Bao et al.

(10) Patent No.: US 12,561,522 B2
(45) Date of Patent: Feb. 24, 2026

(54) CONFIDENCE-BASED INTERACTABLE NEURAL-SYMBOLIC VISUAL QUESTION ANSWERING

(71) Applicant: SAMSUNG ELECTRONICS CO., LTD., Suwon-si (KR)

(72) Inventors: Yajie Bao, Sandy Springs, GA (US); Tianwei Xing, Santa Clara, CA (US); Xun Chen, Fremont, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 130 days.

(21) Appl. No.: 18/387,728

(22) Filed: Nov. 7, 2023

(65) Prior Publication Data

US 2024/0160842 A1 May 16, 2024

Related U.S. Application Data

(60) Provisional application No. 63/424,060, filed on Nov. 9, 2022.

(51) Int. Cl.
*G06F 40/205* (2020.01)
*G06F 16/2457* (2019.01)

(52) U.S. Cl.
CPC ...... *G06F 40/205* (2020.01); *G06F 16/24578* (2019.01)

(58) Field of Classification Search
CPC ............. G06F 3/1258; G06F 16/24578; G06F 16/3329; G06F 16/3344; G06F 16/3347;
(Continued)

(56) References Cited

U.S. PATENT DOCUMENTS

| | | | |
|---|---|---|---|
| 6,233,545 B1 * | 5/2001 | Datig ..................... | G06N 3/004 |
| | | | 706/62 |
| 6,816,831 B1 * | 11/2004 | Iwahashi ................ | G09B 19/06 |
| | | | 704/9 |

(Continued)

FOREIGN PATENT DOCUMENTS

| | | |
|---|---|---|
| CN | 108920587 A | 11/2018 |
| CN | 114969459 A | 8/2022 |

(Continued)

OTHER PUBLICATIONS

Communication dated Feb. 20, 2024, issued by the International Searching Authority in International Application No. PCT/KR2023/018000 (PCT/ISA/220, PCT/ISA/210, and PCT/ISA/237).

(Continued)

*Primary Examiner* — Gerald Gauthier
(74) *Attorney, Agent, or Firm* — Sughrue Mion, PLLC

(57) ABSTRACT

A method of performing visual question answering (VQA), including: obtaining an image and a question corresponding to the image; generating a plurality of feature predictions about at least one object included in the image by providing the image to an artificial intelligence (AI) scene perception model; generating a plurality of symbolic programs and a plurality of program confidence scores by providing the question to an AI question parsing model; selecting a symbolic program associated with a program confidence score which is highest among the plurality of program confidence scores; executing the selected symbolic program by performing a set of logic operations included in the selected symbolic program on the plurality of feature predictions; and determining a natural language answer to the question based on a result of the set of logic operations.

20 Claims, 20 Drawing Sheets

(58) Field of Classification Search

CPC ...... G06F 17/18; G06F 21/577; G06F 40/205; G06F 40/284; G06F 40/56; G06F 3/0237; G06F 16/3335; G06F 16/337; G06F 16/583; G06F 16/90335; G06F 40/279; G06F 40/30; G06N 3/04; G06N 3/044; G06N 3/045; G06N 3/047; G06N 3/049; G06N 3/08; G06N 3/084; G06N 3/088; G06N 5/02; G06N 3/004; G06N 3/042; G06N 3/0442; G06N 3/0495; G06N 3/0895; G06N 5/022; G06N 20/00; G06Q 30/0643; G06Q 30/0273; G06V 10/811; G06V 20/41; G06V 20/49; G06V 10/806; G06V 20/69; G06V 30/18; G09B 19/06; H04L 51/52

See application file for complete search history.

(56) References Cited

U.S. PATENT DOCUMENTS

| | | | | |
|---|---|---|---|---|
| 10,789,755 | B2 * | 9/2020 | Amer | G06V 20/41 |
| 10,949,718 | B2 * | 3/2021 | Costabello | G06V 30/19173 |
| 11,061,945 | B2 * | 7/2021 | Chandrasekaran | |
| | | | | G06F 16/24578 |
| 11,494,431 | B2 * | 11/2022 | Koh | G06N 3/047 |
| 11,544,597 | B2 * | 1/2023 | Cornelio | G06N 5/02 |
| 11,544,869 | B2 | 1/2023 | Ayvaci et al. | |
| 11,570,318 | B2 * | 1/2023 | Xu | G06F 3/1258 |
| 11,593,631 | B2 * | 2/2023 | Dalli | G06N 3/04 |
| 11,663,249 | B2 * | 5/2023 | Su | G06N 3/049 |
| | | | | 707/771 |
| 11,688,022 | B2 * | 6/2023 | Aghajanyan | G06Q 30/0643 |
| | | | | 704/9 |
| 11,755,657 | B2 * | 9/2023 | Rosenthal | G06F 21/577 |
| | | | | 704/9 |
| 11,768,876 | B2 * | 9/2023 | Qin | G06V 10/806 |
| | | | | 382/103 |
| 11,775,574 | B2 * | 10/2023 | Li | G06F 40/279 |
| | | | | 382/156 |
| 11,797,839 | B2 * | 10/2023 | Norouzi | G06N 3/044 |
| 11,854,283 | B2 * | 12/2023 | Lv | G06F 16/3344 |
| 12,165,019 | B2 * | 12/2024 | Kishimoto | G06F 17/18 |
| 12,333,433 | B2 * | 6/2025 | Norouzi | G06N 3/08 |
| 2014/0052437 | A1 * | 2/2014 | Longe | G06F 3/0237 |
| | | | | 704/9 |
| 2017/0199876 | A1 * | 7/2017 | Malatesha | G06F 16/3329 |
| 2018/0181573 | A1 * | 6/2018 | Zhao | G06N 20/00 |
| 2018/0373782 | A1 * | 12/2018 | Liu | G06F 16/90335 |
| 2019/0188271 | A1 * | 6/2019 | Murdock | G06F 40/30 |
| 2020/0356829 | A1 * | 11/2020 | Costabello | G06F 40/56 |
| 2021/0056150 | A1 * | 2/2021 | Karandish | G06N 3/04 |
| 2021/0109956 | A1 | 4/2021 | Su et al. | |
| 2022/0108169 | A1 * | 4/2022 | Saha | G06N 3/088 |
| 2022/0114369 | A1 | 4/2022 | Debnath et al. | |
| 2022/0138433 | A1 * | 5/2022 | Divakaran | G06N 3/045 |
| | | | | 704/9 |
| 2022/0188362 | A1 * | 6/2022 | Ansari | G06N 3/084 |
| 2023/0027713 | A1 * | 1/2023 | Wu | G06V 20/49 |
| 2023/0082605 | A1 * | 3/2023 | Chen | G06F 16/3347 |
| | | | | 704/9 |
| 2023/0106716 | A1 * | 4/2023 | Xiong | G06V 10/811 |
| | | | | 704/9 |
| 2023/0153531 | A1 * | 5/2023 | Geng | G06N 3/084 |
| | | | | 704/9 |
| 2023/0153630 | A1 * | 5/2023 | Kang | G06F 40/284 |
| | | | | 704/9 |
| 2024/0046318 | A1 * | 2/2024 | Muriqi | G06Q 30/0273 |
| 2024/0153630 | A1 * | 5/2024 | Lee | G06V 30/18 |
| 2024/0160842 | A1 * | 5/2024 | Bao | G06F 16/24578 |

FOREIGN PATENT DOCUMENTS

| | | |
|---|---|---|
| CN | 115221369 A | 10/2022 |
| EP | 3920048 A1 | 12/2021 |
| EP | 4046076 A1 | 8/2022 |

OTHER PUBLICATIONS

Eiter et al., "A Neuro-Symbolic ASP Pipeline for Visual Question Answering," arxiv.org, arXiv:2205.07548v1, May 2022, total 17 pages.

Abdessaied et al., "Neuro-Symbolic Visual Dialog," arxiv.org, arXiv:2208.10353v1, Aug. 2022, total 27 pages.

Thomas Eiter et al., "A Confidence-Based Interface for Neuro-Symbolic Visual Question Answering", Institute of Logic and Computation, Jan. 19, 2022, 8 pages.

Communication issued Sep. 18, 2025 by the European Patent Office in European patent Application No. 23889186.5.

Mao, Jiayuan et al., "The Neuro-Symbolic Concept Learner: Interpreting Scenes, Words, and Sentences From Natural Supervision", Published as a conference paper at ICLR 2019, arXiv:1904.12584v1 [cs.CV], Apr. 26, 2019, XP081268396. (28 pages total).

Liang, Weixin et al., "LRTA: A Transparent Neural-Symbolic Reasoning Framework with Modular Supervision for Visual Question Answering", arXiv:2011.10731v1 [cs. CL], Nov. 21, 2020, XP081820011. (10 pages total).

Luo, Haozheng et al., "Open-Ended Multi-Modal Relational Reason for Video Question Answering", ARXIV.ORG, Cornell University Library, Dec. 1, 2020, XP081825700. (7 pages total).

* cited by examiner blue metallic red matte cyan matte green matte yellow matte red metallic

| ID | Color | Material | Shape | Size | Conf. |
|---|---|---|---|---|---|
| 654-0 | Blue, 0.9644 | Metal, 0.9995 | Cylinder, 0.9981 | Large, 0.9995 | 0.9617 |
| 654-1 | Cyan, 0.9631 | Rubber, 0.9996 | Cylinder, 0.9979 | Large, 0.9995 | 0.9602 |
| ... | ... | ... | ... | ... | ... |
| 654-6 | Yellow, 0.9586 | Rubber, 0.9996 | Cube, 0.9979 | Large, 0.9996 | 0.9558 |
| Conf. | 0.9507 | 0.9995 | 0.9974 | 0.9995 | 0.9473 |

Fig. 3B

| Candidate 1, 0.9424 | Candidate 2, 0.9610 | Candidate 3, 0.9558 |
|---|---|---|
| 1. scene | 1. scene | 1. scene |
| 2. filter_color[blue] | 2. filter_color[green] | 2. filter_color[green] |
| 3. filter_material[rubber] | 3. filter_material[rubber] | 3. filter_material[rubber] |
| 4. filter_shape[cylinder] | 4. filter_shape[cylinder] | 4. filter_shape[cylinder] |
| 5. unique | 5. unique | 5. unique |
| 6. relate[behind] | 6. relate[behind] | 6. relate[behind] |
| 7. filter_color[blue] | 7. filter_color[blue] | 7. filter_color[blue] |
| 8. filter_material[metal] | 8. filter_material[metal] | 8. filter_material[metal] |
| 9. filter_shape[cylinder] | 9. filter_shape[cylinder] | 9. filter_shape[cylinder] |
| 10. exist | 10. exist | 10. exist |

Fig. 3C

| ID | Color | Material | Shape | Size | Conf. |
|----|-------|----------|-------|------|-------|
| 2-0 | Blue, 0.9655 | Metal, 0.9994 | Square, 0.9976 | Small, 0.9996 | 0.9621 |
| ... | ... | ... | ... | ... | ... |
| 2-3 | *Grey, 0.4960* | Metal, 0.9995 | Sphere, 0.9975 | Small, 0.9996 | *0.4943* |
| ... | ... | ... | ... | ... | ... |
| Conf. | *0.4960* | 0.9994 | 0.9975 | 0.9993 | *0.4941* |

Fig. 6B

| Program, 0.9999 | Program Execution | |
|-----------------|-------------------|---|
| | without Interaction | with Interaction |
| 1. scene<br>2. filter_size[small]<br>3. filter_color[green]<br>4. unique<br>5. relate[left]<br>6. filter_size[large]<br>7. filter_material[metal]<br>8. unique<br>9. query_shape | 1. scene, 1<br>2. [2-0,2-1,2-3], 0.9993<br>**3. [], 0.9993*0.4960**<br>4. error | 1. scene, 1<br>2. [2-0,2-1,2-3], 0.9993<br>3. *[2-3], 0.9993*0.9630*<br>4. 2-3<br>5. [2-0,2-1,2-2,2-6,2-7]<br>6. [2 2,2-6,2-7]<br>7. [2-7]<br>8. 2-7<br>9. Sphere |

Fig. 6C

| Concepts Predictions with the smallest confidence scores: |
|---|
| *67-1; Color -> Yellow, 0.4580* <br> *67-6: Shape -> Cube, 0.9301* <br> 67-6: Color -> Red, 0.9580 |

Fig. 7B

| Program, 0.9904 | Program Execution with Interaction |
|---|---|
| 1. scene | 1. scene |
| 2. filter_color[red] | 2. [67-6] |
| 3. filter_material[metal] | 3. [67-6] |
| 4. filter_shape[cylinder] | 4. *[67-6]* |
| 5. unique | 5. 67-6 |
| 6. same_size | 6. [67-1,67-2,67-4,67-6,67-7] |
| 7. filter_color[blue] | 7. [] |
| 8. filter_material[metal] | 8. [] |
| 9. filter_shape[cube] | 9. [] |
| 10. exist | 10. no |

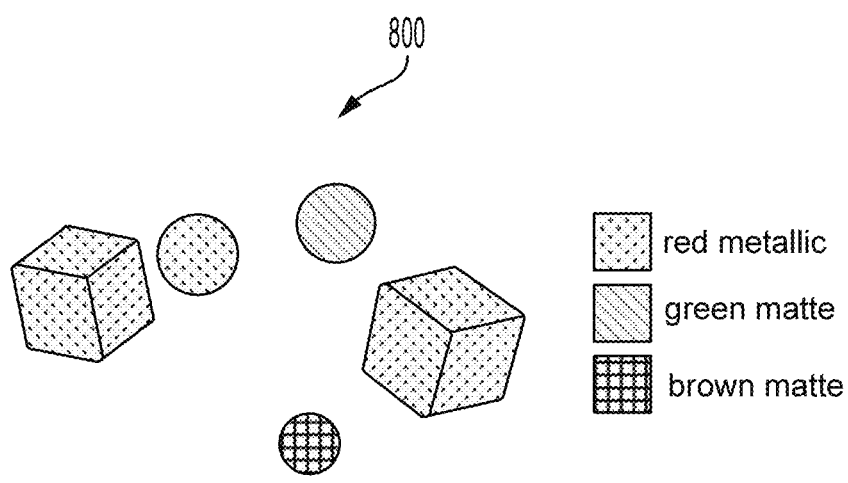

Fig. 8A

| Program Candidates: | | |
|---|---|---|
| Candidate 1, 0.8786 | Candidate 2, 0.8329 | Candidate 3, 0.8399 |
| 1. scene<br>2. filter_size[small]<br>3. filter_color[brown]<br>4. unique<br>5. relate[left]<br>6. filter_size[large]<br>7. filter_material[metal]<br>8. filter_shape[cube]<br>9. unique<br>10. relate[left]<br>11. filter_size[large]<br>12. filter_material[metal]<br>13. filter_shape[cube]<br>14. unique<br>15. relate[left]<br>16. filter_color[red]<br>17. filter_shape[sphere]<br>18. count | 1. scene<br>2. filter_size[small]<br>3. filter_color[brown]<br>4. unique<br>5. relate[left]<br>6. filter_size[large]<br>7. filter_material[metal]<br>8. filter_shape[cube]<br>9. unique<br>10. relate[left]<br>11. filter_color[red]<br>12. filter_shape[sphere]<br>13. count | 1. scene<br>2. filter_size[small]<br>3. filter_color[brown]<br>4. unique<br>5. relate[left]<br>6. *filter_size[small]*<br>7. filter_color[brown]<br>8. unique<br>9. relate[left]<br>10. filter_size[large]<br>11. filter_material[metal]<br>12. filter_shape[cube]<br>13. unique<br>14. relate[left]<br>15. filter_color[red]<br>16. filter_shape[sphere]<br>17. count |

Fig. 8B

| Concepts Predictions with the smallest confidence scores: |
|---|
| _8727-1: Shape -> Cylinder, 0.5815_ <br> 8727-0: Shape -> Cube, 0.9543 |

Fig. 9B

| Program Candidates: | | |
|---|---|---|
| _Candidate 1, 0.8345_ | Candidate 2, 0.8664 | Candidate 3, 0.8911 |
| 1. scene <br> 2. filter_size[small] <br> 3. filter_color[red] <br> 4. filter_material[rubber] <br> 5. filter_shape[cylinder] <br> 6. unique <br> 7. relate[right] <br> 8. filter_shape[cylinder] <br> 9. unique <br> 10. relate[left] <br> 11. filter_shape[cylinder] <br> 12. unique <br> 13. relate[front] <br> 14. filter_color[red] <br> 15. filter_shape[cylinder] <br> 16. unique <br> 17. query_size | 1. scene <br> 2. filter_size[small] <br> 3. filter_color[red] <br> 4. filter_material[rubber] <br> 5. filter_shape[cylinder] <br> 6. unique <br> 7. relate[behind] <br> 8. filter_shape[cylinder] <br> 9. unique <br> 10. relate[front] <br> 11. filter_color[red] <br> 12. filter_shape[cylinder] <br> 13. unique <br> 14. query_size | 1. scene <br> 2. filter_size[small] <br> 3. filter_color[red] <br> 4. filter_material[rubber] <br> 5. filter_shape[cylinder] <br> 6. unique <br> 7. relate[right] <br> 8. filter_shape[cylinder] <br> 9. unique <br> 10. relate[left] <br> 11. _filter_color[brown]_ <br> 12. filter_shape[cylinder] <br> 13. unique <br> 14. relate[front] <br> 15. filter_color[red] <br> 16. filter_shape[cylinder] <br> 17. unique <br> 18. query_size |

Fig. 9C

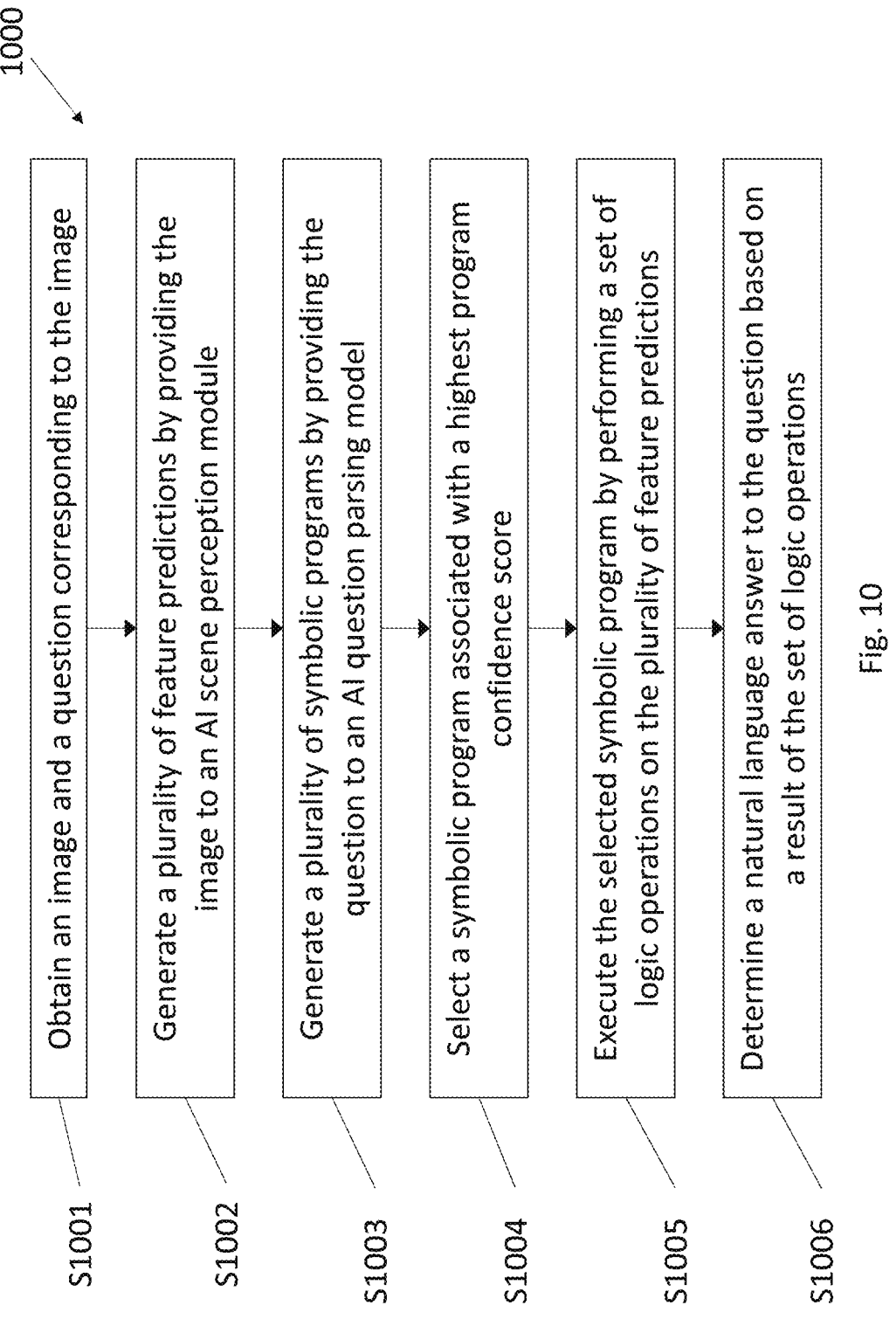

S1001   Obtain an image and a question corresponding to the image

S1002   Generate a plurality of feature predictions by providing the image to an AI scene perception module S1003   Generate a plurality of symbolic programs by providing the question to an AI question parsing model S1004   Select a symbolic program associated with a highest program confidence score S1005   Execute the selected symbolic program by performing a set of logic operations on the plurality of feature predictions S1006   Determine a natural language answer to the question based on a result of the set of logic operations

Figure 12:
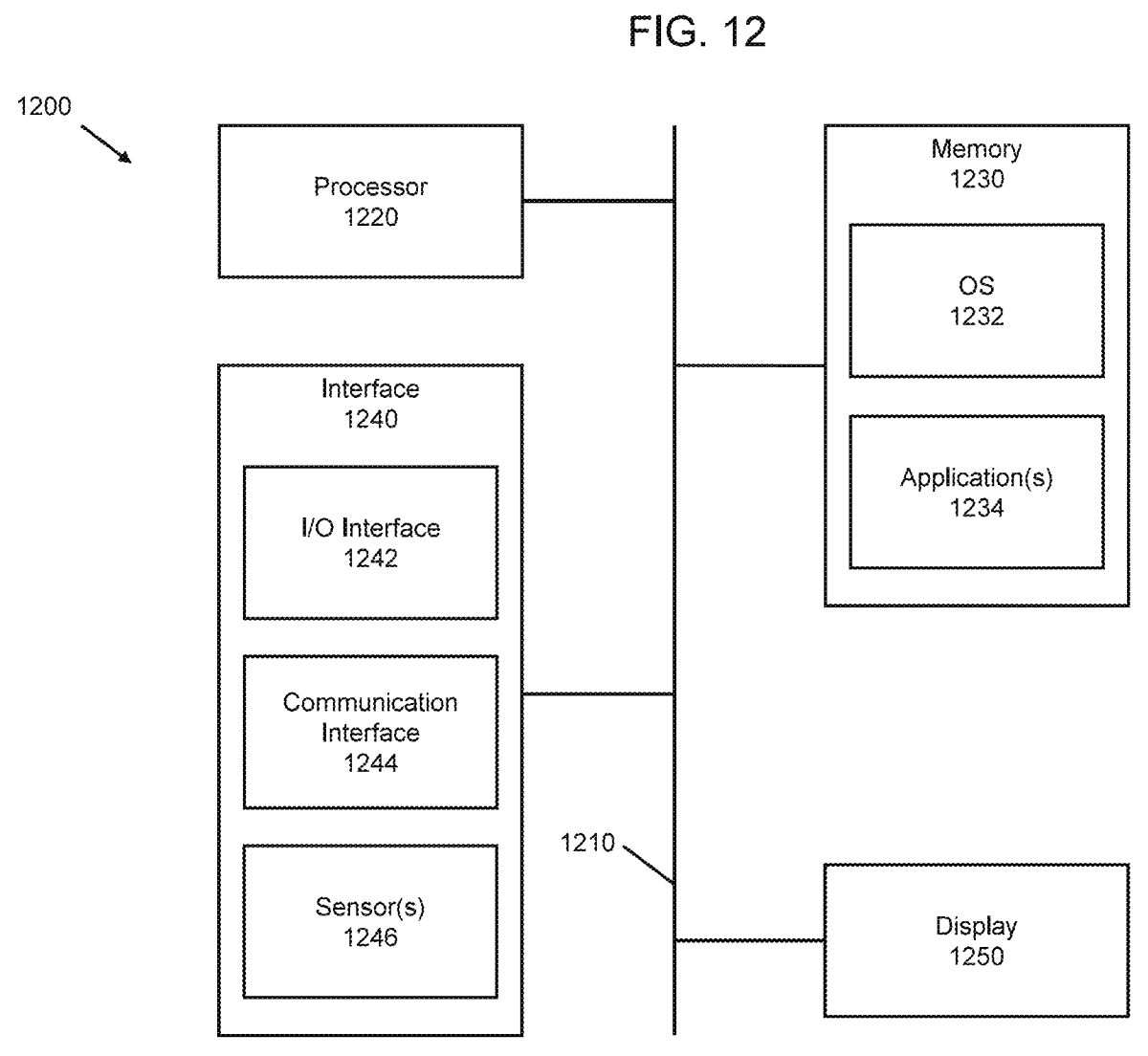

Memory
1230

OS
1232

Application(s)
1234

Display
1250

1210

Processor
1220

Interface
1240

I/O Interface
1242

Communication
Interface
1244

Sensor(s)
1246

CONFIDENCE-BASED INTERACTABLE NEURAL-SYMBOLIC VISUAL QUESTION ANSWERING

CROSS-REFERENCE TO RELATED APPLICATION(S)

This application is based on and claims priority under 35 U.S.C. § 119 to U.S. Provisional Patent Application No. 63/424,060, filed on Nov. 9, 2022, in the U.S. Patent & Trademark Office, the disclosure of which is incorporated by reference herein in its entirety.

BACKGROUND

1. Field

The disclosure relates to a method for performing visual question answering (VQA) tasks, and an apparatus for the same, and more particularly to a an interactable confidence based neural-symbolic method of performing VQA tasks, and an apparatus for the same.

2. Description of Related Art

Visual Question Answering (VQA) may refer to a task of providing accurate natural language answers based on a given imagery context and natural language questions about the images. VQA is becoming increasingly important in a wide range of applications including smart assistants, information retrieval, and assistance for users with visual impairments. Visual questions may selectively target different areas and aspects of an image, and may require detailed understanding of the image and complex reasoning.

While data-driven methods, for example deep learning, may work in an end-to-end fashion, the lack of explainability, high computational cost, and requirements of large amounts of data may hinder their applications in the real world. In addition, data-driven visual question answering (VQA) models may be prone to exploit biases in datasets to find shortcuts instead of performing high-level reasoning, and may not be able to maintain reasoning consistency in answering a compositional question and its sub-questions.

Neural-symbolic (NS) learning provides an efficient approach for VQA by combining the advantages of neural network learning and symbolic reasoning. The use of NS to perform VQA may introduce transparency to the reasoning process and allows diagnosis on each execution step. However, the neural networks (NN) in some NS methods may be treated as black-box models, and cannot provide information for involving user interactions.

SUMMARY

Example embodiments address at least the above problems and/or disadvantages and other disadvantages not described above. Also, the example embodiments are not required to overcome the disadvantages described above, and may not overcome any of the problems described above.

In accordance with an aspect of the disclosure, a method of performing visual question answering (VQA), includes obtaining an image and a question corresponding to the image; generating a plurality of feature predictions about at least one object included in the image by providing the image to an artificial intelligence (AI) scene perception model; generating a plurality of symbolic programs and a plurality of program confidence scores by providing the question to an AI question parsing model, wherein each symbolic program of the plurality of symbolic programs includes a set of logic operations and is associated with a corresponding program confidence score from among the plurality of program confidence scores; selecting a symbolic program associated with a program confidence score which is highest among the plurality of program confidence scores; executing the selected symbolic program by performing the set of logic operations included in the selected symbolic program on the plurality of feature predictions; and determining a natural language answer to the question based on a result of the set of logic operations.

The image and the question may be received from a user, and the method may further include providing the natural language answer to the user as a response to the question.

The plurality of feature predictions may be associated with a plurality of feature confidence scores generated by the AI scene perception model.

The set of logic operations included in the selected symbolic program may be associated with a plurality of operation confidence scores, and each logic operation of the set of logic operations may be associated with an operation confidence score from among the plurality of operation confidence scores, the operation confidence score being determined based on at least one of the program confidence score and the plurality of feature confidence scores.

Based on at least one confidence score of the plurality of program confidence scores, the plurality of feature confidence scores, and the plurality of operation confidence scores being below a threshold value: the method may further include obtaining user input corresponding to the at least one confidence score; and adjusting the at least one confidence score based on the user input.

The method may further include determining an answer confidence score corresponding to the natural language answer based on the plurality of operation confidence scores.

The method may further include generating augmented training data based on the plurality of symbolic programs; and training the AI scene perception model based on the augmented training data.

The generating of the augmented training data may include generating a first ranking of the plurality of symbolic programs based on the plurality of program confidence scores; generating a second ranking of the plurality of symbolic programs based on a plurality of agreement losses between the plurality of program confidence scores and the question; selecting a subset of the plurality of symbolic programs based on the first ranking and the second ranking; and generating the augmented training data based on outputs of the subset of the plurality of symbolic programs.

In accordance with an aspect of the disclosure, an apparatus for performing VQA includes a memory configured to store instructions; and at least one processor configured to execute the instructions to: obtain an image and a question corresponding to the image; generate a plurality of feature predictions about at least one object included in the image by providing the image to an AI scene perception model; generate a plurality of symbolic programs and a plurality of program confidence scores by providing the question to an AI question parsing model, wherein each symbolic program of the plurality of symbolic programs includes a set of logic operations and is associated with a corresponding program confidence score from among the plurality of program confidence scores; select a symbolic program associated with a program confidence score which is highest among the plurality of program confidence scores; execute the selected symbolic program by performing the set of logic operations included in the selected symbolic program on the plurality of feature predictions; and determine a natural language answer to the question based on a result of the set of logic operations.

The image and the question may be received from a user, and the at least one processor may be further configured to execute the instructions to provide the natural language answer to the user as a response to the question.

The plurality of feature predictions may be associated with a plurality of feature confidence scores generated by the AI scene perception model.

The set of logic operations included in the selected symbolic program may be associated with a plurality of operation confidence scores, and each logic operation of the set of logic operations may be associated with an operation confidence score from among the plurality of operation confidence scores, the operation confidence score being determined based on at least one of the program confidence score and the plurality of feature confidence scores.

The at least one processor may be further configured to execute the instructions to: based on at least one confidence score of the plurality of program confidence scores, the plurality of feature confidence scores, and the plurality of operation confidence scores being below a threshold value: obtain user input corresponding to the at least one confidence score; and adjust the at least one confidence score based on the user input.

The at least one processor may be further configured to execute the instructions to determine an answer confidence score corresponding to the natural language answer based on the plurality of operation confidence scores.

The at least one processor may be further configured to execute the instructions to: generate augmented training data based on the plurality of symbolic programs; and train the AI scene perception model based on the augmented training data.

To generate the augmented training data, the at least one processor may be further configured to: generate a first ranking of the plurality of symbolic programs based on the plurality of program confidence scores; generate a second ranking of the plurality of symbolic programs based on a plurality of agreement losses between the plurality of program confidence scores and the question; select a subset of the plurality of symbolic programs based on the first ranking and the second ranking; and generate the augmented training data based on outputs of the subset of the plurality of symbolic programs.

In accordance with an aspect of the disclosure, a non-transitory computer readable medium stores instructions which, when executed by at least one processor of a device for performing VQA, cause the at least one processor to: obtain an image and a question corresponding to the image; generate a plurality of feature predictions about at least one object included in the image by providing the image to an AI scene perception model; generate a plurality of symbolic programs and a plurality of program confidence scores by providing the question to an AI question parsing model, wherein each symbolic program of the plurality of symbolic programs includes a set of logic operations and is associated with a corresponding program confidence score from among the plurality of program confidence scores; select a symbolic program associated with a program confidence score which is highest among the plurality of program confidence scores; execute the selected symbolic program by performing the set of logic operations included in the selected symbolic program on the plurality of feature predictions; and determine a natural language answer to the question based on a result of the set of logic operations.

The plurality of feature predictions may be associated with a plurality of feature confidence scores generated by the AI scene perception model.

The set of logic operations included in the selected symbolic program may be associated with a plurality of operation confidence scores, and each logic operation of the set of logic operations may be associated with an operation confidence score from among the plurality of operation confidence scores, the operation confidence score being determined based on at least one of the program confidence score and the plurality of feature confidence scores.

The instructions may be further configured to cause the at least one processor to: based on at least one confidence score of the plurality of program confidence scores, the plurality of feature confidence scores, and the plurality of operation confidence scores being below a threshold value: obtain user input corresponding to the at least one confidence score; and adjust the at least one confidence score based on the user input.

BRIEF DESCRIPTION OF THE DRAWINGS

The above and other aspects, features, and aspects of embodiments of the disclosure will be more apparent from the following description taken in conjunction with the accompanying drawings, in which:

FIGS. 3A-3D illustrate an example of interactable visual question answering, according to embodiments of the present disclosure;

FIGS. 6A to 6C illustrate an example of interactable visual question answering, according to embodiments of the present disclosure;

FIGS. 7A to 7C illustrate an example of interactable visual question answering, according to embodiments of the present disclosure;

FIGS. 8A to 8B illustrate an example of interactable visual question answering, according to embodiments of the present disclosure;

FIGS. 9A to 9C illustrate an example of interactable visual question answering, according to embodiments of the present disclosure;

FIG. 10 is a flowchart illustrating a method of performing visual question answering, according to embodiments of the present disclosure;

FIG. 12 is a diagram of components of one or more electronic devices of FIG. 11 according to embodiments of the present disclosure.

DETAILED DESCRIPTION

Figure 1:
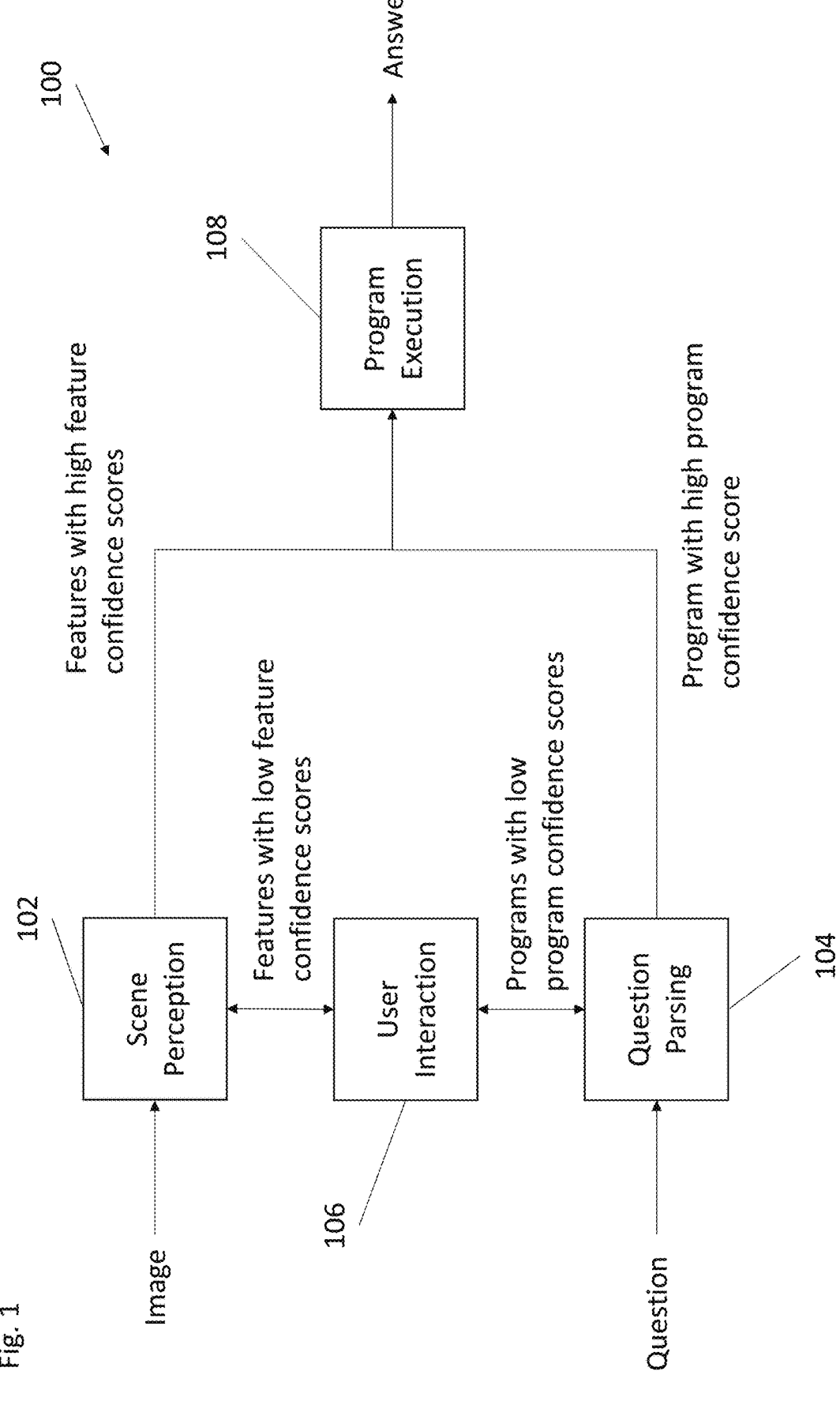
FIG. 1 is a diagram showing a system for performing visual question answering, according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

The term "module" is intended to be broadly construed as hardware, software, firmware, or any combination thereof.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

To enhance learning efficiency and explainability, neural-symbolic (NS) learning has been studied to combine the high explainability, provable correctness, and ease of using human expert knowledge of symbolic manipulation with the advantages of neural networks (NN). For visual question answering (VQA), NS methods may use NN for both extracting object concepts (which may be referred to as scene perception) and translating questions into symbolic programs (which may be referred to as question parsing), and to perform symbolic manipulation by executing the programs on the concepts.

However, NS methods cannot eliminate the disadvantages of NN. For example, there may be inevitable uncertainty in the NN, due to probabilistic variations in random events or the lack of knowledge of a process. Some methods for NS VQA may focus on reducing the requirements of symbolic labels (e.g., neural-symbolic concept learner (NS-CL)), learning new symbols (e.g., meta concept learner), or increasing the complexity of tasks, (e.g., video question answering, requiring machines to understand physical laws), without considering the uncertainty propagation along the reasoning path. The absence of uncertainty awareness for reasoning fails to consider the long-tail distribution of visual concepts and the unequal importance of reasoning steps in real data, and cannot provide information for user interactions, which can result in mistakes that are intolerable for safety-critical applications.

Therefore, embodiments may provide uncertainty awareness which may consider the large variances of predictions for concepts at the end of the heavy-tailed distribution, set the importance of reasoning steps based on the uncertainty quantification of the concepts and programs, and warn humans of possibly incorrect inferences for interactions. For example, one or more example embodiments may provide an interactable confidence-based NS (CBNS) framework to evaluate the confidence of the NN modules and make inferences based on the confidence evaluations to perform tasks such as VQA. In embodiments, the confidence evaluations may also be used as signals for user interactions. One or more example embodiments may provide a probabilistic question parser which may not use the resource-intensive REINFORCE learning process, and may generate multiple program candidates with confidence evaluations. One or more example embodiments may also include a probabilistic scene perception module which may provide object-based scene representation and confidence evaluations for each attribute of one or more objects in an image. According to one or more example embodiments, the object-based scene representation and the programs with confidence evaluations may be used for evaluating the confidence of answers during the inference process, which may allow user interactions and feedback on weak links based on confidence levels to improve the reliability of answers. Embodiments may be model-agnostic, and may be compatible with other NS VQA architectures.

One or more example embodiments may consider the uncertainty in both scene perception and question parsing in the context of VQA. Some NS-CL methods may use differentiable program execution for training visual representations and REINFORCE for training the question parser in order to avoid the requirements of ground truth concepts and programs. While quantifying uncertainty in NS-CL and inheriting the advantages of NS-CL is doable, the joint uncertainties in both scene perception and question parsing can exacerbate the training overhead of REINFORCE, because the gradient from a probabilistic module may pass into a program executor, adding noise to parameter updates.

Instead, according to one or more example embodiments, the learning efficiency of the question parser may be improved by adding reconstruction loss, agreement loss, and variational dropout such that a question parser can achieve high accuracy using a limited amount of data. In addition, a data augmentation rule may be used to select predicted programs by the confidence evaluations, which may be based on the uncertainty quantification by variational dropout, such that the selected programs may be accurate with a high probability. Then, the selected programs may be used to train a scene perception module without groundtruth programs. Further, the uncertainties of the scene perception module can be quantified, to evaluate the confidence of the object concept predictions (which may be referred to as concept quantization in NS-CL) of the scene perception module. The concept quantization with the confidence evaluations may be input into the predicted program candidates for confidence-based reasoning.

According to one or more example embodiments, a CBNS VQA may provide a benefit by allowing effective user interactions. For example, in some NS VQA methods, only one representation for an image and one deterministic program for an associated question may be predicted, and a single answer may be provided at the end. In contrast, one or more example embodiments may provide confidence evaluations for each step of the inference starting from the scene perception, which may be used to trigger further investigation or even user interactions. For example, whenever the confidence level of a particular step is too low, for example by being below a threshold, the CBNS VQA system may request that a user examines and corrects (if necessary) the inference of the particular step, and thus improve the accuracy and confidence of the final answer.

FIG. 1 is a diagram showing a system for performing visual question answering, according to embodiments of the present disclosure.

For example, a CBNS system 100 for performing VQA as shown in FIG. 1 may include a scene perception module 102, a question parsing module 104, a user interaction module 106, and a program execution module 108.

The scene perception module 102 may extract object-based representations of images an provide confidence evaluations based on uncertainty quantification. For example, a pretrained mask regions with convolutional neural networks (R-CNN) model may be used to generate object proposals. Then, a bounding box for each proposal, paired with the original input image, may be sent to a ResNet-34 model to extract a region-based feature and image-based feature. The, the concatenation of region- and image-based features is used for concept quantization with uncertainty quantification.

The question parsing module 104 may translate a natural language question into multiple programs associated with confidence scores. The multiple programs may facilitate a search for accurate programs. In embodiments, the question parsing module 104 may be referred to as a question parser.

The program execution module 108 may execute the programs from the question parsing module 104 based on the concept quantization from the scene perception module 102 with confidence evaluations for answer predictions. In some embodiments, an error flag may be raised for a program when a type mismatch occurs between input and output across adjacent operations in execution. In embodiments, the program execution module 108 may output the answer of the executable program with the highest confidence score. Additionally, when there are errors in all the program candidates for a question, the program execution module 108 may randomly sample an answer from all possible outputs of the final operation.

The user interaction module 106 may be used to verify, and correct if necessary, the inference at each step of reasoning. In embodiments, the program execution module 108 may trace the confidence of the intermediate answers, and may trigger the user interaction module 106 to check the inference when the confidence score is lower than a threshold. In embodiments, the threshold may be determined based on a trade-off between answer accuracy and interaction demands.

Accordingly, in one or more example embodiments, the question parsing module 104 may transform questions into programs and provide multiple program candidates with confidence scores for each candidate. The scene perception module 102 may provide object-based representations of images with confidence evaluations for each concept prediction. The program execution module 108 may execute programs on the object-based representations with confidence evaluations for each logic operation.

To make the execution outputs fully differentiable with respect to the parameters in the scene perception module 102 for concept learning, the program execution module 108 may be a quasi-symbolic execution module, which may mean that the intermediate results of the programs may be represented as the attention mask over all objects in the scene. For example, each element of the mask $Maski \in [0,1]$ may denote the probability that the i-th object of the scene belongs to the intermediate results. However, rather than using REINFORCE for training the question parsing module 104, semi-supervised learning may be used to improve the learning efficiency. Therefore, in embodiments a sufficiently accurate question parsing module 104 with uncertainty quantification may be obtained from limited fully-annotated data.

In addition, to avoid the requirements of groundtruth programs or the programs from the exploration of REIN-FORCE for training the concept learner, programs that are correct with a high probability may be selected from the predicted programs by the question parsing module 104 for concept learning. For example, the programs may be selected by the confidence evaluations of the predicted programs based on uncertainty quantification, and used to train the scene perception module 102 with uncertainty quantification. In this way, the uncertainty in training the question parsing module 104 may not disturb the training of the scene perception module 102 in an end-to-end training approach. For reasoning, the confidence evaluations of the scene perception module 102 and the question parsing module 104 along the reasoning paths may be utilized to determine the final answers to questions by the program execution module 108 and to request user interactions by the user interaction module 106.

Figure 2:
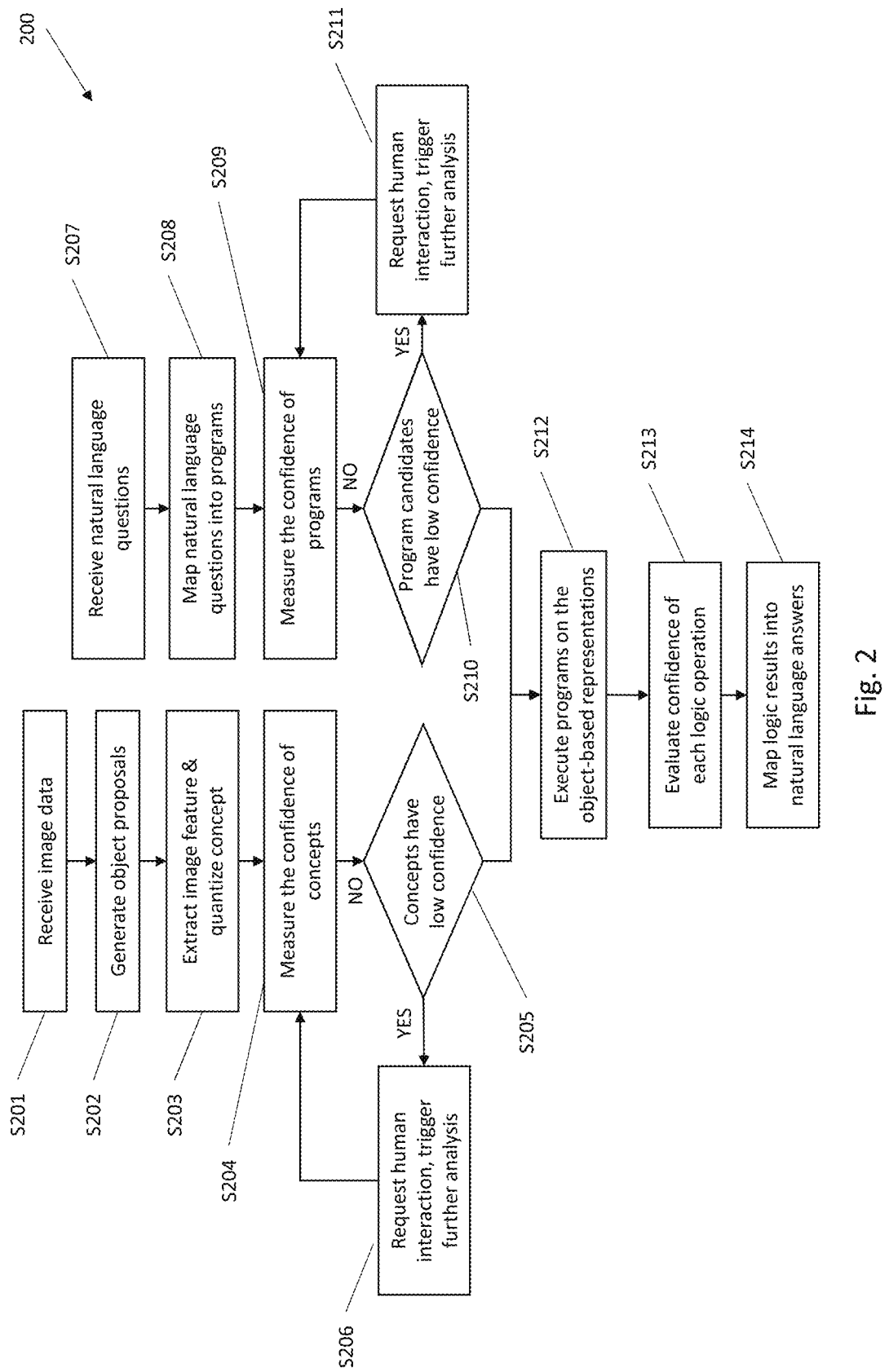
FIG. 2 is a flowchart illustrating a method of performing visual question answering, according to embodiments of the present disclosure.
Figure 3A:
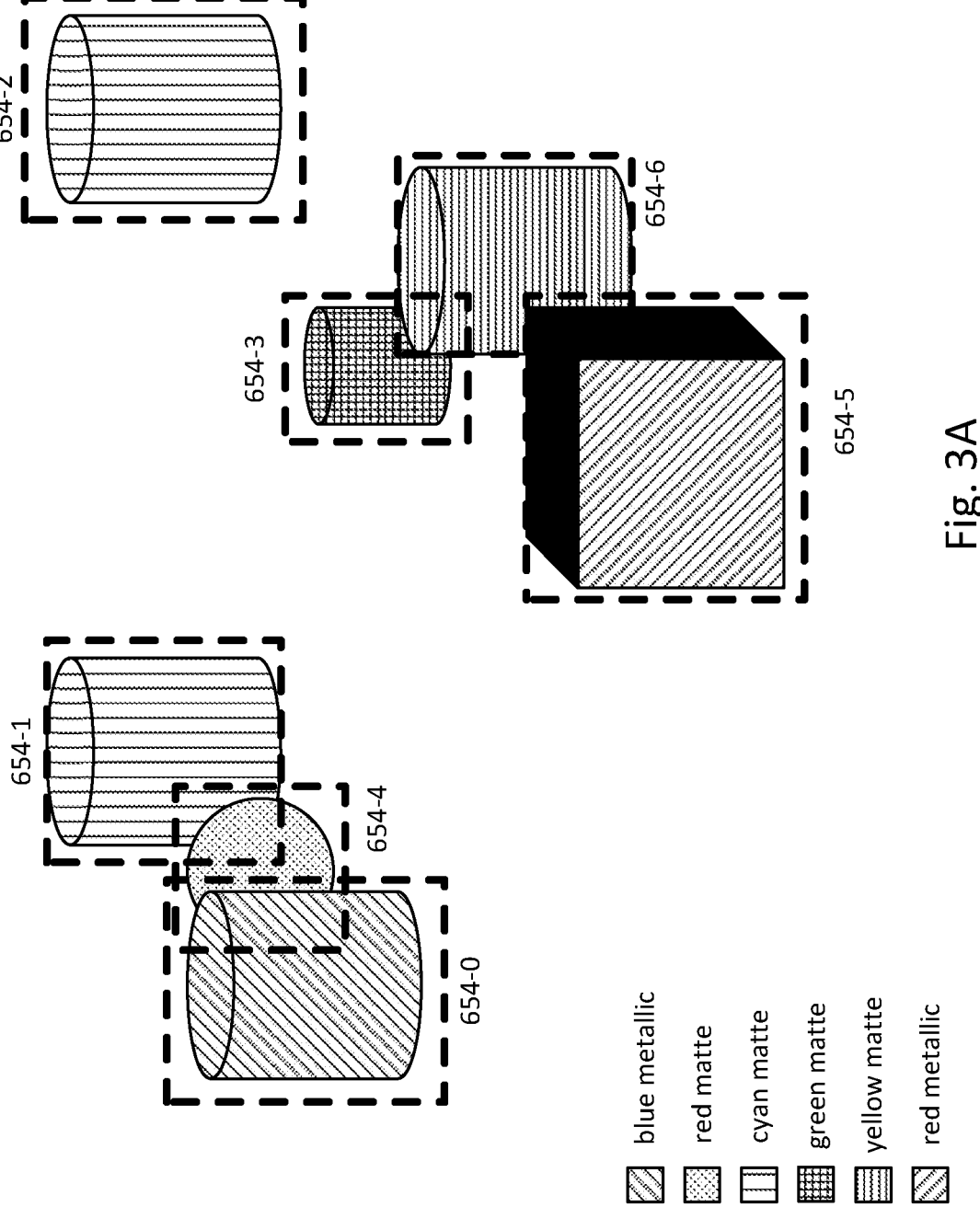
Figure 3D:
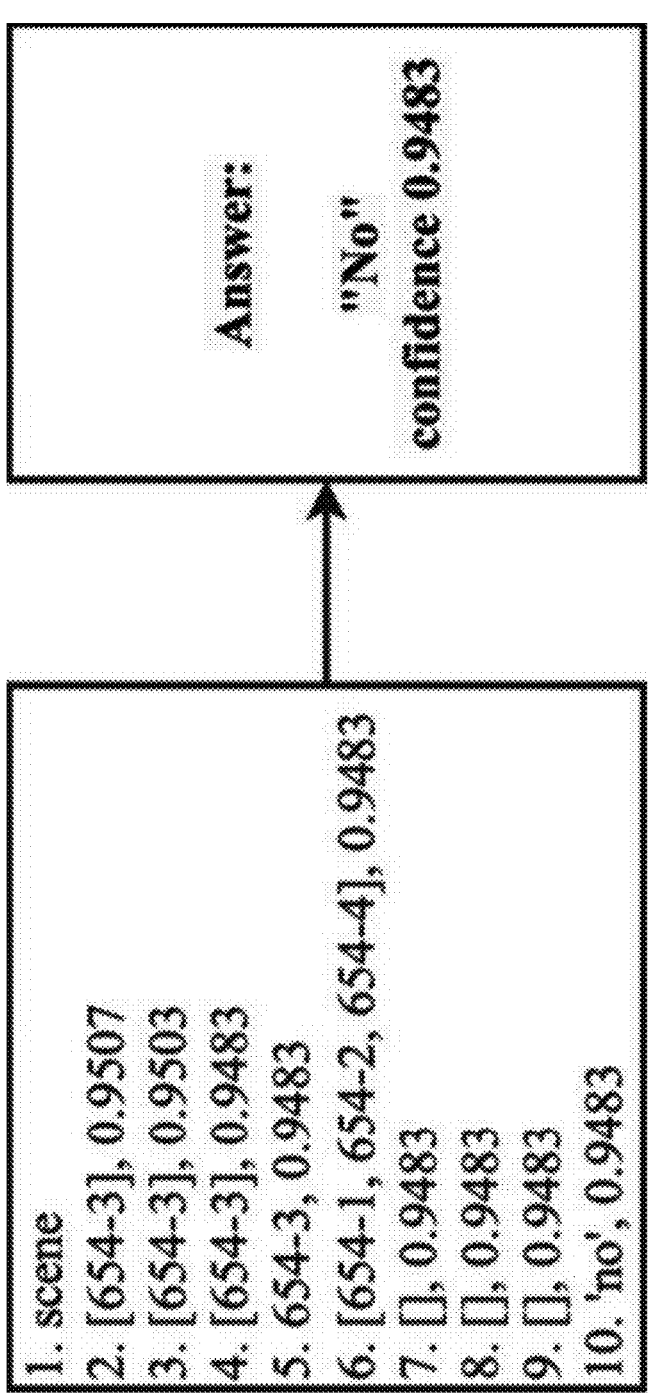

FIG. 2 is a flowchart illustrating a method of performing visual question answering, according to embodiments of the present disclosure, and FIGS. 3A-3D illustrate an example of interactable visual question answering, according to embodiments of the present disclosure. In particular, FIG. 3A illustrates an example of an input image, FIG. 3B illustrates an example of an output of a scene perception module, FIG. 3C illustrates an example of an output of a question parsing module, and FIG. 3D illustrates an example of an output of an execution module, according to embodiments of the present disclosure. FIG. 2 is described below with reference to FIGS. 3A-3D, however embodiments are not limited thereto. For example, according to embodiments, different inputs may be provided, and the intermediate and final outputs may be in different forms or include different information.

In embodiments, the operations of FIG. 2 may be performed by the CBNS system of FIG. 1. For example, as discussed in greater detail below, operations S201 to S204 may be performed by or using the scene perception module 102, operations S207 to S209 may be performed by or using the question parsing module 104, and operations S205 to S206 and S210-S211 may be performed by or using the user interaction module 106, and operations S212 to S214 may be performed by or using the program execution module 108, however embodiments are not limited thereto. For example, in embodiments operations S205 to S206 and S210-S211 may be performed by or using one or more of the scene perception module 102, the question parsing module 104, and the program execution module 108.

As shown in FIG. 2, the method 200 may include operation S201 of receiving image data, and operation S202 of generating object proposals corresponding to the image data. FIG. 3A illustrates an example of an input image 300 which is annotated based on the object proposals. For example, as shown in FIG. 3A, objects 654-6 to 654-6 may be detected in the input image 300 and associated with bounding boxes and labels.

The method 200 may further include operation S203 of extracting image features and quantizing concepts. In embodiments, the features and concepts may correspond to attributes of the objects. For example, as shown in FIG. 3B, attributes such as color, material, shape, and size may be determined for each of objects 654-0 to 654-6. As another example, the attribute size may include two concepts, for example "large" and "small". For example, as shown in FIG. 3B, for the object 654-0, a concept of "blue" may be determined for the color attribute, a concept of "metal" may be determined for the material attribute, a concept of "cylinder" may be determined for the shape attribute, and a concept of "large" may be determined for the size attribute.

The method 200 may further include operation S204 of measuring confidence corresponding to the objects. In embodiments, the confidence may include a confidence score for each concept corresponding to each object. For example, as shown in FIG. 3B, for the object 654-0, a confidence score of 0.9644 may be calculated for the concept "blue", a confidence score of 0.9995 may be calculated for the concept "metal", a confidence score of 0.9981 may be calculated for the concept "cylinder", a confidence score of 0.9995 may be calculated for the concept "large". In addition, the calculated confidence may include a total confidence score for each object across all of its corresponding concepts, and a total confidence score for each attribute across all of its corresponding concepts. For example, as shown in FIG. 3B, a total confidence score for the object 654-0 may be calculated to be 0.9617, based on the confidence scores of the concepts discussed above. In addition, total confidence score for the color attribute may be calculated as 0.9507 based on confidence scores for the concepts if the color attribute corresponding to each of the objects 654-0 to 654-6. Further, a total confidence for the input image may be determined based on the total confidence scores for the attributes and the total confidence scores for the objects. For example, as shown in FIG. 3B, a confidence score of 0.9473 may be calculated for the input image 300.

The method 200 may further include operation S205 of determining whether a confidence score associated with a concept is too low, for example by being below a confidence threshold. Based on the confidence score being too low (YES at operation S205), the method 200 proceeds to operation S206, which may include at least one of requesting user interaction and triggering further analysis. Based on the confidence score being satisfactory, for example by being greater than or equal to the confidence threshold, the method 200 may proceed to operation S212.

The method 200 may further include operation S207 of receiving one or more natural language questions, operation S208 of mapping the natural language questions into programs. For example, as shown in FIG. 3C, program candidates Candidate 1, Candidate 2, and Candidate 3 may be determined based on an input question of "There is a green rubber cylinder, are there any blue shiny cylinders behind it?". In embodiments, each program candidate may include one or more logic operations which may be performed on the attributes discussed above.

The method 200 may further include operation S209 of measuring confidence corresponding to the programs. For example, a confidence score of 0.9424 may be calculated for Candidate 1, a confidence score of 0.9610 may be calculated for Candidate 2, and a confidence score of 0.9558 may be calculated for Candidate 3.

The method 200 may further include operation S210 of determining whether a confidence score associated with a program candidate is too low, for example by being below a confidence threshold. Based on the confidence score being too low (YES at operation S205), the method 200 proceeds to operation S211, which may include at least one of requesting user interaction and triggering further analysis. Based on the confidence score being satisfactory, for example by being greater than or equal to the confidence threshold, the method 200 may proceed to operation S212. In embodiments, the confidence threshold used in operation S210 may be the same as, or different from, the confidence threshold used in operation S205.

The method 200 may further include operation S212 of executing one or more of the programs on the object-based representations, for example the concepts and attributes discussed above. The method 200 may further include operation S213 of evaluating the confidence of logic operations corresponding to the programs, and mapping results of the logic operations into natural language answers. For example, as shown in FIG. 3D, based on Candidate 2 having a higher confidence score than Candidate 1 and Candidate 3, Candidate 2 may be selected. The logic operations of Candidate 2 may then be executed on the concepts discussed above to obtain a natural language answer of "No". A confidence score may be calculated for each logic operation included in Candidate 2 when executed on the attributes discussed above, and then an overall confidence score of 0.9483 may be calculated for the natural language answer of "No".

Figure 4A:
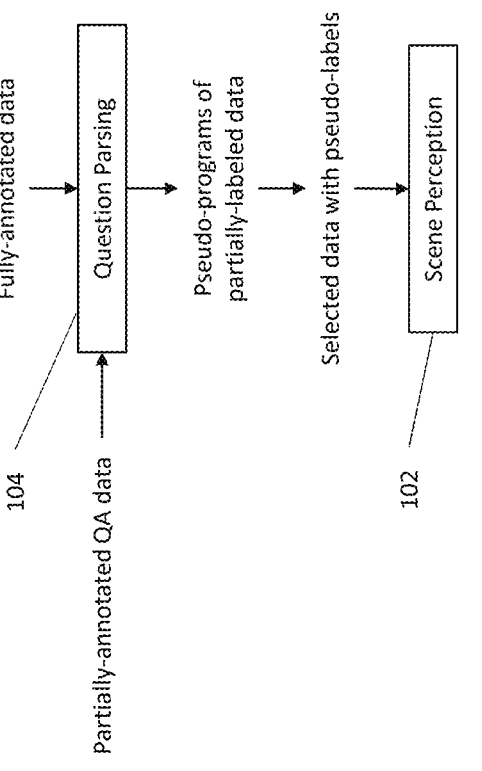
FIG. 4A is a diagram of a training framework for training a system for performing visual question answering, according to embodiments of the present disclosure.
Figure 4B:
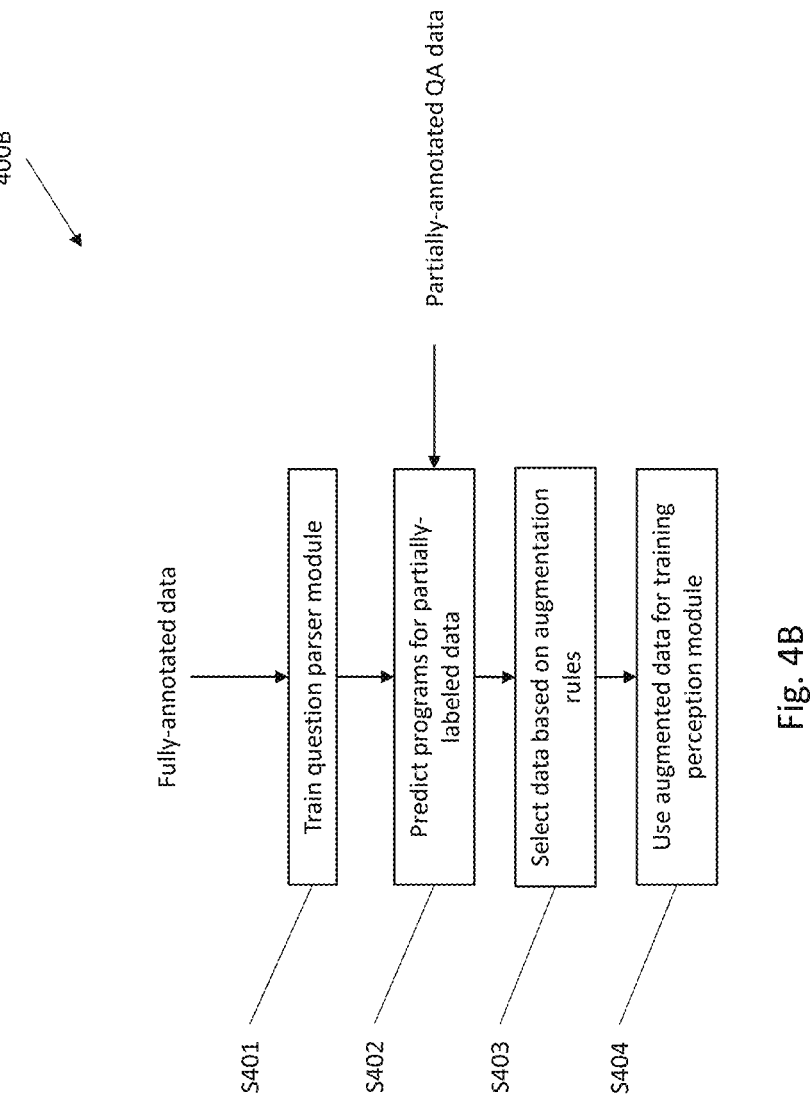
FIG. 4B is a flowchart illustrating a method of training a system for performing visual question answering, according to embodiments of the present disclosure, according to embodiments of the present disclosure.

FIG. 4A is a diagram of a training framework for training a system for performing visual question answering, according to embodiments of the present disclosure. FIG. 4B is a flowchart illustrating a method of training a system for performing visual question answering, according to embodiments of the present disclosure, according to embodiments of the present disclosure.

As shown in FIGS. 4A-4B, the method 400B corresponding to the training framework 400A may include operation S401 of training the question parsing module 104 using limited fully-annotated data. For example, the question parsing module 104 may be trained based on a relatively small set of fully-annotated training data. For example, the fully-annotated training data may be fully labeled with ground truth labels for at least one of the objects, concepts, questions, programs, logic operations, and answers.

The method 400B may further include operation S402 of predicting and evaluating programs generated based on questions sampled from the training set without using groundtruth programs. For example, the question parsing module 104 may receive a relatively large amount of partially-annotated data The partially-annotated data may only include high-level ground-truth labels, such as labels for questions and answers.

The method 400B may further include operation S403 of selecting programs, for example based on data augmentation rules. For example, based on the partially-annotated data, the question parsing module 104 may generate pseudo-labels corresponding to the partially-annotated data, and confidence scores corresponding to the pseudo-labels. In embodiments, the partially-annotated data and the pseudo-labels may be referred to as augmented data.

The method 400B may further include operation S403 of training the scene perception module 102 based on the augmented data. For example, based on the confidence scores, some of the augmented data may be selected, and the scene perception module 102 may be trained based on the selected augmented data.

Figure 5A:
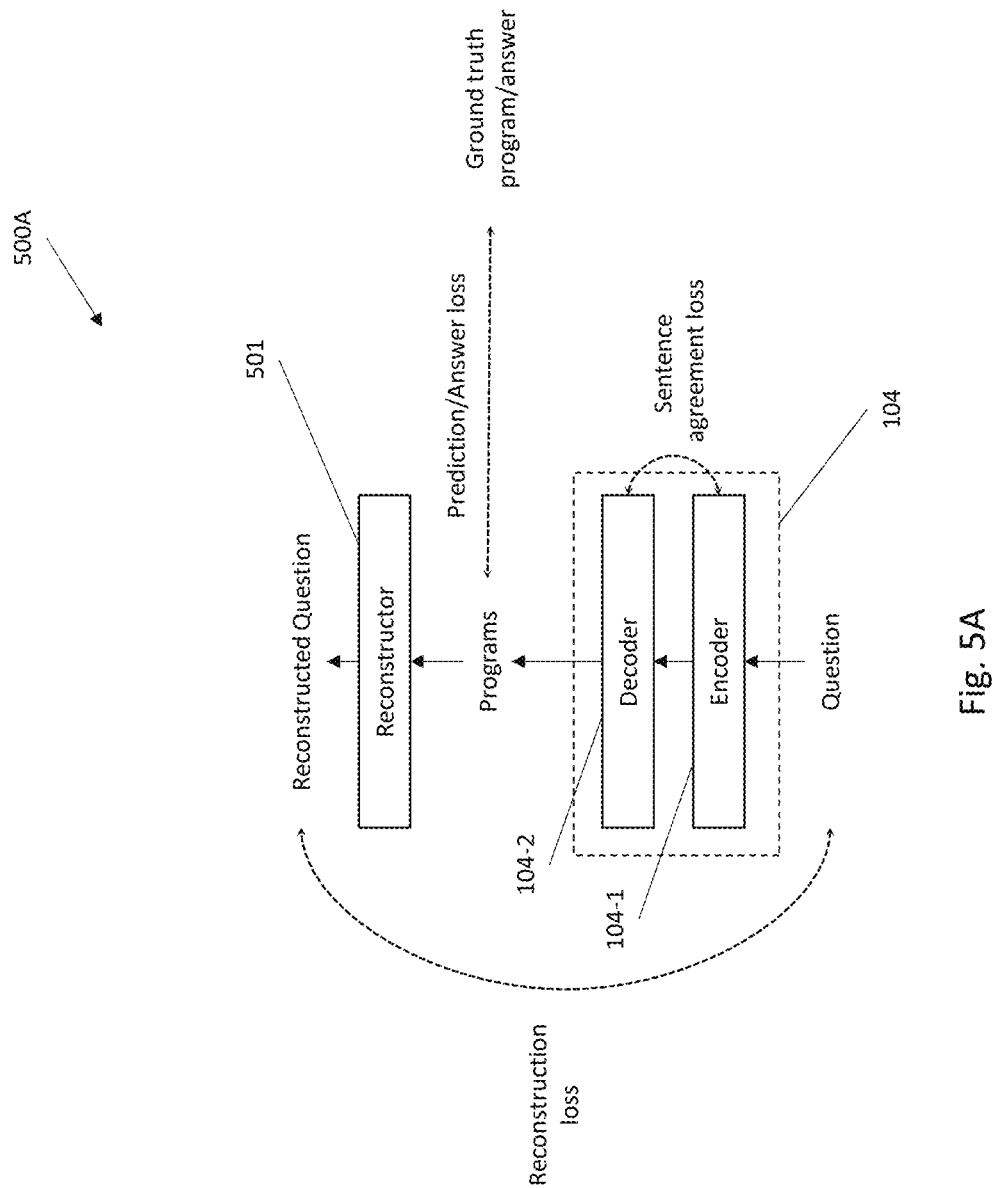
FIG. 5A is a diagram of a training framework for training question parsing module, according to embodiments of the present disclosure.
Figure 5B:
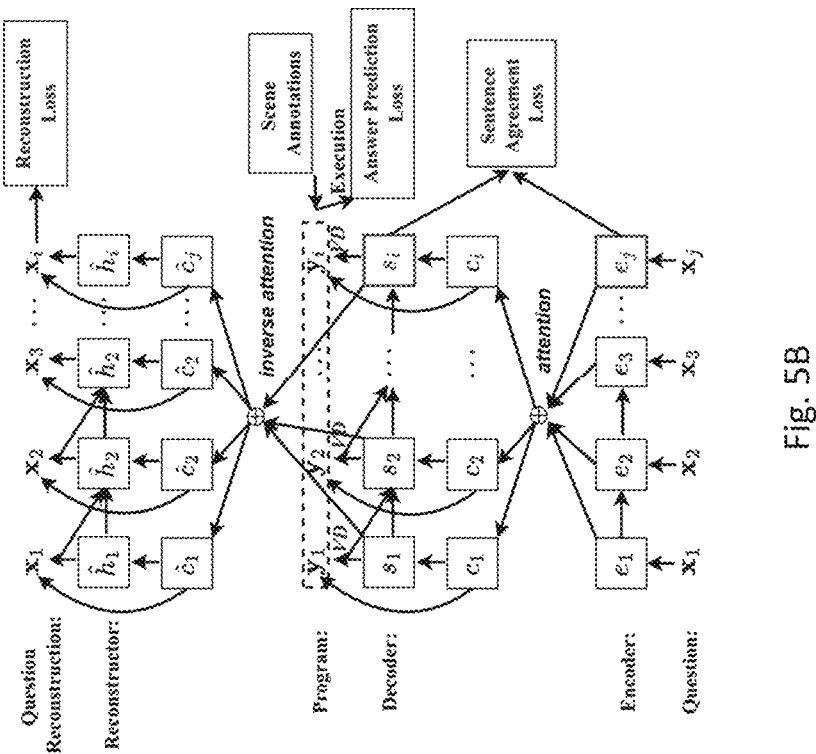
FIG. 5B is a flowchart illustrating a method of training a question parsing module, according to embodiments of the present disclosure.

FIGS. 5A-5B are diagrams of a training framework for training a question parsing module, according to embodiments of the present disclosure.

In the discussion below referring to training frameworks 500A and 500B, $i_a$ may denote the input image, $o_p$ may denote the objects, $a_p$ may denote the attributes of the objects, and $c_p \in C_p$ may denote the concepts. Further, $C_p$ may denote the set of all the concepts, and $|C_p|$ may denote the number of concepts. Each object may be described by $n_{a_p}$ attributes, and attribute $a_p$ may include $n_{a_p}{}^{c_p}$ concepts. For example, in the CLEVR dataset, each object has 5 attributes (e.g., color, material, shape, size, and position) and the attribute size may include two concepts (i.e., large and small). The scene annotation of an image, denoted by $s_a$, may include the descriptions of object concepts and positions. Further, In addition, $x^n$ may denote the n-th question, and $y^n$ may denote the n-th program in the dataset. Moreover, $x_i$ may denote the i-th word in a question and $y^t$ may denote the t-th operation in a program. Additionally, $\hat{\cdot}$ may denote the estimation of a variable. The answer may be denoted as $a$, and the confidence score may be denoted as $c_s$.

As shown in FIGS. 5A-5B, the question parsing module 104 may include a machine-learning (ML) model such as an attention-based sequence to sequence (seq2seq) model which includes an encoder 104-1 and a decoder 104-2 which may be used to transform questions into symbolic programs.

For example, the encoder 104-1 may be represented by a bidirectional long short-term memory (LSTM) network that takes as input a question of variable lengths and outputs an encoded vector $e_j = [e_i{}^F, e_i{}^B]$ at time step i according to Equation 1 and Equation 2 below:

$$e_i^F, h_i^F = \text{LSTM}(\phi_E(x_i), h_{i-1}^F) \qquad \text{Equation (1)}$$

$$e_i^B, h_i^B = \text{LSTM}(\phi_E(x_i), h_{i-1}^B) \qquad \text{Equation (2)}$$

In Equation 1 and Equation 2, $\phi_E$ may denote the jointly trained word embedding for the encoder 104-1, $(e_i{}^F, h_i{}^F)$ and $(e_i{}^B, h_i{}^B)$ denote the outputs and hidden states of the forward and backward networks, respectively. The decoder 104-2 may be a similar LSTM network having an output according to Equation 3 below:

$$q_t^P, s_t = \text{LSTM}(\phi_D(y_{t-1}), s_{t-1}) \qquad \text{Equation (3)}$$

In Equation 3, $y_{t-1}$ may denote the previous token of the output sequence and $\phi_D$ may denote the decoder word embedding, which is then fed to an attention layer with identity attention matrix to obtain a context vector $c_t^P$ as a weighted sum of the encoded states $e_i$ via Equation 4 below:

$$a_{ti}^P = \text{softmax}(q^{PT}e_i), c_t^P = \Sigma_i a_{ti}^P e_i \qquad \text{(Equation 4)}$$

Then, $[q_t^P, c_t^P]$ may be passed to a fully connected layer with softmax activation to obtain the conditional distribution of the predicted token $\hat{y}_t$.

In order to train the question parsing module 104, a reconstructor 501 may be used to reconstruct the question from the hidden layer of the decoder 104-2 to ensure that the program retains the information in the question. The reconstructor 501 may be a similar decoder having an output $q_i^R$ according to Equation 5 below:

$$q_i^R = \text{LSTM}(\phi_R(x_{i-1})) \qquad \text{Equation (5)}$$

The output may then be fed to an attention layer as according to Equation 6 below:

$$a_{it}^R = \text{softmax}(q_i^R W_A s_t), c_i^R = \Sigma_t a_{ti}^R s_t \qquad \text{Equation (6)}$$

In Equation 6, $W_A$ denotes the attention weight matrix of the reconstructor 501. The distribution for the predicted token may be obtained by $x_i^R \sim \text{softmax}(W_O^R[q_i^R, c_i^R])$. Then, the reconstruction loss may be determined according to Equation 7 below:

$$R(x^n|s^n; \gamma) = \frac{1}{N}\sum_{n=1}^{N} \log p(x^n|s^n; \gamma) \qquad \text{Equation (7)}$$

In Equation 7, $s^n$ may denote the sequence of the hidden states of the decoder for the n-th question. Furthermore, predictions of both the seq2seq model of the encoder 104-1 and the reconstructor 501 at the current time step may be based on the predictions at the previous time step. To enforce the sequence level agreement, a sequence agreement loss shown in FIGS. 5A-5B may be determined according to Equation 8 below:

$$A(x^n|y^n) = \frac{1}{N}\sum_{n=1}^{N} \|e_E(x^n) - s_D(y^n)\|^2 \qquad \text{Equation (8)}$$

In Equation 8, $e_E \in \mathbb{R}^d$ and $s_D \in \mathbb{R}^d$ may denote the hidden states of the encoder 104-1 and decoder 104-2 at the last time step, respectively, and d denotes the dimension of the hidden states.

To quantify the model uncertainty of the question parsing module 104, variational dropout (VD) and local reparameterization may be used. The scale-invariant log-uniform prior $p(w)$ and a factorized Gaussian approximate posterior $q\phi(w)$ may be used with parameters $\phi$. In embodiments, may be learned by maximizing according to Equation 9 and Equation 10 below:

$$\mathcal{L}(\phi) = (-D_{KL}(q_\phi(w)\|p(w))) + \mathcal{L}_D(\phi) \qquad \text{Equation (9)}$$

$$\mathcal{L}_D(\phi) = \Sigma_{n=1}^{N}\mathbb{E}_{q\phi(w)}[\log p(y^n|x^n, w)] \qquad \text{Equation (10)}$$

In Equation 9 and Equation 10, $\mathcal{L}_D(\phi)$ may be approximated by an unbiased differentiable minibatch-based Monte Carlo estimator according to Equation 11 below:

$$\mathcal{L}_D(\phi) \approx \sum_{n=1}^{N}\left(\frac{1}{M}\sum_{k=1}^{M} \log p(y^n|x^n, w^{(k)})\right) \qquad \text{Equation (11)}$$

In Equation 11, $w^{(k)}$ may be sampled from $q_\phi(w)$. For example, $q_\phi(w_i) = \mathcal{N}(\phi_i, \alpha\phi_i^2)$, and $w_i = \phi_i + \sqrt{\alpha\phi_i^2}\in_i$, where $w_i$ may denote the i-th weight, $\in_i \sim \mathcal{N}(0,1)$, and $\alpha$ may denote the dropout rate. Variational dropout in the decoder 104-2 of the question parsing module 104 may be used for uncertainty quantification, as shown in FIGS. 5A-5B. For example, using the decoder output $q_t^P$ and the context vector $c_t^P$, the distribution for the predicted token may be obtained according to Equation 12 below:

$$\hat{y} \sim \text{softmax}(W_0\text{ReLU}(\text{VariationalDropout})[q_t^P, c_t^P]; w))) \quad \text{Equation (12)}$$

In embodiments, a deterministic weight matrix $W_0$ may be used for token prediction to reduce the model complexity.

In embodiments, the question parsing module 104 may be used to perform uncertainty-aware inference. For example, using Monte Carlo (MC) sampling by $q_\phi(w)$, multiple models may be obtained and model averaging may be performed for program generation. For example, multiple outputs $\{h^{(k)} = W_0\text{ReLU}(\text{VariationalDropout})[q_t^P, c_t^P]; w^{(k)}))\}_{k=1}^M$ given $[q_t^P, c_t^P]$ may be generated, and the outputs $h^{(k)}$ may be used estimate the conditional distribution of the token $y_t$ according to Equation 13 below:

$$\hat{p}(y_t | y_{t-1}, \ldots, y_1, x_1) = \text{softmax}\left(\frac{1}{M}\sum_{k=1}^M h^{(k)}\right) \quad \text{Equation (13)}$$

In embodiments, to exploit and deal with the uncertainty in the question parsing module 104 learned from data, multiple programs may be generated. Beam search (BS) may refer to a test-time decoding algorithm in neural machine translation, which may suffer from a lack of diversity. Approaches have been proposed to enhance diversity. However, the diversity of BS may be determined by $\hat{p}$. When $\hat{p}$ is close to a uniform distribution, then BS may generate diverse sequences; if $\hat{p}$ is close to one-hot encoding, simply enforcing diversity may increase the discrepancy between the training and testing process of BS, and thus degrade the performance of decoding. Moreover, minimizing the negative log-likelihood in the training process may result in overly confident predictions and uncalibrated uncertainty, which may not correspond well with model error. Using variational dropout can moderate this problem by considering model uncertainty.

To generate B programs, at each time step t of decoding, the top-B beam candidates of symbolic modules may be stored, where B may denote the beam width, and the candidates may be sorted by $\Theta(y_t) = \Sigma_{i=1}^t \theta(y_i)$ with $\theta(y_i) = \log \hat{p}(y_i | y_{i-1}, \ldots, y_1, x^n)$. At the next time step, all possible single token extensions of these beams may be considered, and the B most likely extensions may be selected. This process may be repeated until maximum time T. Then the most likely B sequences may be selected.

However, the log-probabilities of beams may not correspond well to the probability that the program candidates are correct due to the model error/uncertainty. Therefore, model uncertainty may be considered to determine the most promising program. The probabilities of beams may be calibrated by penalizing the average estimations with variances according to Equation 14 below:

$$\hat{p}_C = \frac{\mathbb{E}[\hat{p}(y^n | x^n)]}{\text{Var}(\hat{p}(y^n | x^n))} \quad \text{Equation (14)}$$

In embodiments, confidence scores of the program candidates may be calculated. For example, to enable the aggregation of the uncertainty quantification of individual modules for confidence-based interactable reasoning, a confidence score based on the uncertainty of predictions may be used. The confidence score $c_s$ of the model may be evaluated according to Equation 15 below:

$$c_s(\hat{p}(y|x)) = \left(1 - \frac{\text{Var}(\hat{p}(y|x))}{\mathbb{E}[(\hat{p}(y|x))]}\right)^\beta \in [0, 1] \quad \text{Equation (15)}$$

In Equation 15, the values of $\hat{p}(y|x)$ may be estimated using the weights drawn from $q_\phi(w)$ by the MC method, $\beta$ may denote a tuning hyper-parameter to control the difference between confidence values of programs of larger differences. In embodiments, the confidence score $c_s$ may be between 0 and 1, as the variance of a probability may be no greater than the corresponding expectation. Moreover, the confidence score $c_s$ may increase as the uncertainty (described by variances) decreases, and the confidence score $c_s$ may be positively correlated with the calibrated probability $\hat{p}_c$ discussed above.

To avoid the requirements of groundtruth programs or the programs from the exploration of REINFORCE to train the concept learner, data augmentation rules are used to select programs that have a high probability of being correct from the predicted programs of the questions in the training set for concept learning. First, the B programs may be ranked by the calibrated probabilities. In embodiments, the reconstruction loss and the agreement loss of each program candidate can be utilized to evaluate the candidates. However, the reconstruction loss may suffer from error propagation, as the predictions at the current time step may be based on the predictions at the previous time step. Instead, the agreement loss measures the coverage of the programs to the questions, using the hidden states of the encoder and decoder which summarize the information of questions and programs. Therefore, another ranking of the program candidates may be obtained based on the agreement loss between the candidates and the question. Then, the questions may be selected when the two rankings reach a consensus on the top-1 programs. Next, the selected questions may be ranked again by the calibrated probabilities of the top-1 program, and the dataset may be augmented with the top questions associated with the top-1 predicted programs.

Since the accuracy of the programs by the data augmentation rules may be high (e.g., 99.88%+), the selected programs can be used as pseudo groundtruth programs to learn the parameters of the scene perception module 102. To quantify the uncertainty in scene perception module, variational dropout may be applied to the object features.

For determining an objects concepts (which may be referred to as concept quantization), a neural operator that maps the object representation to an embedding may be used. Then, the attribute may be determined based on the cosine distances between the learned concept vectors $v$ and the embedding of the object. For example, the probability of the concepts that belong to attribute $a_p$ for an object $o_p$ may be estimated according to Equation 16 below:

$$\hat{p}_{a_p}(c_p | o_p) = \sigma\left(b^{a_p} \cdot \frac{<u(o_p), v^{c_p}> - \gamma}{\tau}\right) \quad \text{Equation (16)}$$

In Equation 16, $b^{a_p}$ may denote an L1 normalized vector of length $|C_p|$, $u(\cdot)$ may denote the neural operator, and $v^{c_p}$ may denote the concept vector of the concept $c_p$. In addition, $\sigma$ may denote the softmax function and $\langle \cdot, \cdot \rangle$ may denote the cosine distance. Further, $\gamma$ and $\tau$ are scalar constants for scaling and shifting the values of similarities.

While training the scene perception module 102, one model $u^{(1)}(\cdot)$ may be sampled by the posteriors and compute one embedding for concept quantization of $o_p$. Additionally, the optimization objective of the scene perception module 102 may be to maximize the likelihood of the final answers $a_n$ being correct, as shown in Equation 17 below:

$$\max_v \sum_{n=1}^N \sum_{k=1}^M \ell\big(a^n, E\big(P\big(\big(i_n^p, v^{(k)}\big), \hat{P}^n\big)\big)\big) \qquad \text{Equation (17)}$$

In Equation 17, E may denote the program execution module 108, and P may denote the scene perception module 102 with parameters $v$ (for example including the ResNet-34 for extracting object features, the neural operators for attributes, and the concept vectors). Further, a may denote the answer, $i_p$ may denote the image, and $\hat{P}^n$ may denote the pseudo-groundtruth program from the candidates for the c-th question.

For evaluation, M models may be sampled, M embeddings $\{u^{(k)}(o_p)\}_{k=1}^M$ may be computed, and the probabilities $\hat{p}^{(k)}=(c_p|o_p)$ may be computed with respect to all the concepts for each embedding. Additionally, softmax may be used to normalize the probabilities for all the concepts. Then, the confidence scores may be computed and used to weight the probabilities of concepts calculated by the average embeddings $$\frac{1}{M}\sum_{k=1}^M u^{(k)}(o_p).$$

The weighted probabilities may be used for concept quantization, and the prediction of the attribute value may be the concept with the highest weighted probability.

The average confidence score $\bar{c}_s$ of an attribute $a_p$ for an object $o_p$ may be computed using Equation 18 below:

$$\bar{c}_s(a_p|o_p) = \frac{1}{|C^p|}\sum_{c_p \in C_p} c_s\big(\hat{p}_{a_p}(c_p|o_p)\big) \qquad \text{Equation 18}$$

The minimal value of the confidence scores of an attribute for all objects in an image may be used as the confidence score of an attribute of the image, for example according to Equation 19 below:

$$c_s(a_p|i_p) = \min_{o_p} c_s(a_p|o_p) \qquad \text{Equation 19}$$

Then, the products of the confidence scores of all the attributes are used as the confidence score of the image according to Equation 20 below:

$$c_s(i_p) = \Pi_{a_p} c_s(a_p|i_p) \qquad \text{Equation 20}$$

Using the confidence scores of images, the most predictions having the highest confidence scores may be selected as scene annotations for data augmentation and fine-tuning the question parsing module 104. In embodiments, the dataset for training question parsing module 104 and scene perception module 102 may be augmented with programs having the highest confidence scores.

In embodiments, the confidence scores may be used during execution of the program, or for example to trigger user interaction. After concept quantization of an image and program generation for a question about the image with confidence evaluations, the confidence may be evaluated for each step of the program execution. For example, a confidence score $c_s^t$ for the t-th functional operation in a program that involves an attribute $a_p$ may be calculated according to Equation 21 below:

$$c_s^t = \min_{o_p \in O_t} c_s(a_p|o_p) \qquad \text{Equation (21)}$$

In Equation 21, $O^t$ may denote the set of objects that are involved in the t-th operation, as the confidence score of the t-th step. Then, the confidence score of the answer derived by executing the program may be determined using Equation 22 below $$c_s(i_p, x, y) = \big(T\sqrt{\Pi c_s^t}\big)^a \times c_s(\hat{p}(y|x))^{1-a} \qquad \text{Equation (22)}$$

In Equation 22, T may denote the number of operations involving attributes in the program, $T\sqrt{\cdot}$ may be used to normalize the score, and a may denote a tuning parameter to control the relative importance of the final confidence scores of perception and program. In embodiments, a may be chosen to achieve the largest area under curve (AUC) score using the answer confidence score to predict the correctness of answers on the training set. Using the confidence evaluations, the CBNS system 100 may request user interactions at any stage of the reasoning process. In addition, the interactions may be assigned to the weakest links based on the demands and supplies of available resources. Because scene perception may provide the information for answering the questions and the concepts may be compositional, the incorrect prediction of a concept for one object in an image may result in wrong answers. By correcting the possibly wrong predictions of concepts with confidence scores that are lower than the thresholds, the interactions may correct the mistakes and avoid the entanglement of errors from individual modules. After the interactions, the current confidence score may be set to 1 for continuing to compute the confidence scores.

Concept accuracy may be important for pure symbolic reasoning, and even one incorrect prediction of an attribute for one object in an image can result in wrong answers for questions involving the object. End-to-end approaches and quasi-symbolic methods may derive correct answers even with incorrect intermediate answers (which may be referred to as the consistency of reasoning), however this may bring more confusion to the reasoning process and make the model unexplainable. Therefore, embodiments may introduce user interactions based on the confidence estimation to rectify the inaccurate prediction, which may be effective and efficient for consistent, transparent, and correct reasoning. Examples of confidence evaluations being used to allow users to assist inference and reasoning are shown below with respect to FIGS. 6A-6C and 7A-7C.

Figure 6A:
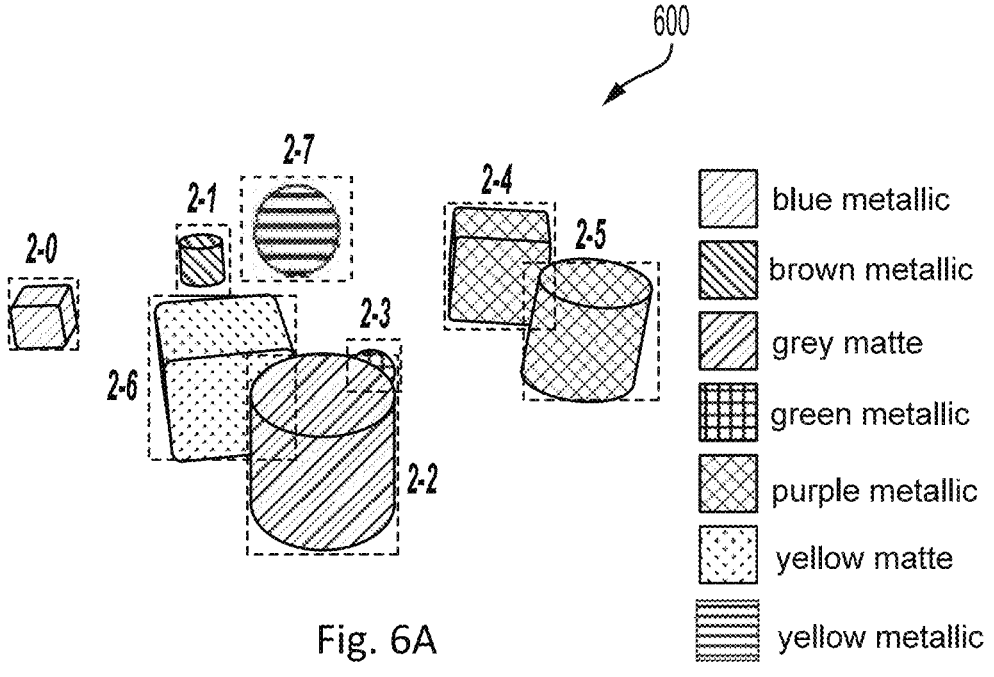

FIGS. 6A to 6C illustrate an example of interactable visual question answering, according to embodiments of the present disclosure. In particular, FIG. 6A illustrates an example of an input, FIG. 6B illustrates an example of an output of a scene perception module, and FIG. 6C illustrates an example of a selected program and an output of an execution module, according to embodiments of the present disclosure.

FIGS. 6A-6C relate to an example in which a low confidence score is calculated for a concept by the scene perception module 102. As shown in FIG. 6A, an input image 600 may include bounding boxes and labels for objects 2-0 to 2-7.

As shown in FIG. 6B, the scene perception module 102 may generate a prediction for object 2-3 which results in a low confidence score of 0.4960 for the concept "Grey" corresponding to the color attribute of object 2-3, which may result in a low confidence score of 0.4943 for the object 2-3, and a low overall confidence score of 0.4941 for the scene perception for the image 600. For example, the confidence scores for the concept "Grey", the object 2-3, and the image 600 may be below one or more confidence thresholds.

Therefore, the CBNS system 100 may request user interaction after scene perception module 102 performs the scene perception in order to correct the prediction and improve confidence. The user interaction module 106 may obtain an input from a user which indicates the concept "Green" for the color attribute of the object 2-3. Accordingly, the CBNS system 100 may update the concept of the color attribute of the object 2-3 to be "Green", and may set a corresponding confidence score to 1.

As shown in FIG. 6C, a selected program may be determined based on an input question of "There is a big metallic thing left of the tiny green object, what is its shape?". When the program is executed without user interaction, the result of the execution may be an error, which may be caused by the incorrect perception of object 2-3, which produced the low confidence score. However, the user interaction discussed above may allow the program to be executed successfully, by providing an answer of "sphere".

Figure 7A:
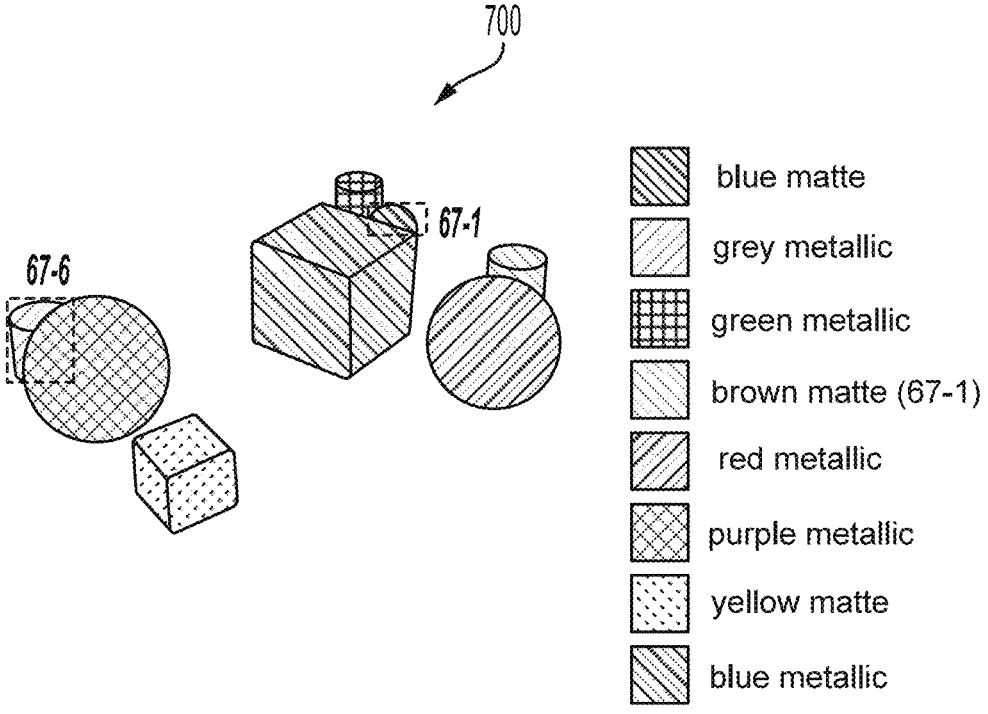

FIGS. 7A to 7C illustrate an example of interactable visual question answering, according to embodiments of the present disclosure. In particular, FIG. 7A illustrates an example of an input image, FIG. 7B illustrates an example of an output of a scene perception module, and FIG. 7C illustrates an example of a selected program and an output of an execution module, according to embodiments of the present disclosure.

FIGS. 7A-7C relate to an example in which a low confidence score is calculated for a concept by the scene perception module 102. As shown in FIG. 7A, an input image 700 may include bounding boxes and labels for objects 67-1 and 67-6.

As shown in FIG. 7B, the scene perception module 102 may generate a prediction for object 67-1 which results in a low confidence score of 0.4580 for the concept "Yellow" corresponding to the color attribute of object 67-1, and a prediction for object 67-6 which results in a low confidence score of 0.9301 for the concept "Cube" corresponding to the shape attribute of object 67-6. For example, the confidence scores for the concept "Yellow" for the object 67-1 and the concept "Cube" for the object 67-6 may be below one or more confidence thresholds, for example a threshold of 0.94.

Therefore, the CBNS system 100 may request user interaction after scene perception module 102 performs the scene perception in order to correct the predictions and improve confidence. The user interaction module 106 may obtain an input from a user which indicates the concept "Brown" for the color attribute of the object 67-1. In addition, the user interaction module 106 may obtain an input from the user which indicates the concept "Cylinder" for the shape attribute of the object 67-6, and which confirms the concept "Red" for the color attribute of the object 67-6. Accordingly, the CBNS system 100 may update the concept of the color attribute of the object 67-1 to be "Brown", may update the concept of the shape attribute of the object 67-6 to be "Cylinder", may maintain the concept of the color attribute of the object 67-6 to be "Red", and may set a corresponding confidence score for all of these concepts to 1.

As shown in FIG. 7C, a selected program Program may be determined based on an input question of "Is there a blue metallic cube of the same size as the red metal cylinder?". When the program is executed with the user interaction triggered by the threshold of 0.94 discussed above, the result of the execution may be successful, by providing an answer of "no". However, a confidence threshold lower than 0.94 may result in errors which are uncorrected.

In embodiments, the confidence scores estimated by the CBNS system 100 may be used to trigger operations other than requesting user interactions, for example triggering further analysis using more powerful ML models. For example, the CBNS system 100 may use a less complex CBNS-VQA model for general queries, and then when the confidence of a predicted attribute is low, the the CBNS system 100 may adapt a more powerful ML model to correct the predicted attribute in order to obtain robust performance and increased efficiency.

FIGS. 8A and 8B illustrate an example of interactable visual question answering, according to embodiments of the present disclosure. In particular, FIG. 8A illustrates an example of an input image, and FIG. 8B illustrates examples of program candidates, according to embodiments of the present disclosure.

FIGS. 8A and 8B relate to an example in which the scene perception has high confidence while the question parsing has low confidence. As shown in FIG. 8B, program candidates Candidate 1, Candidate 2, and Candidate 3 may be generated based on an input question of "How many red balls are to the left of the large shiny block to the left of the small brown object?". Candidate 1 may have missing information at operations 10-14, and Candidate 3 may have missing information at operation 6. In addition, the confidence scores of all three of the program candidates may be below a threshold of 0.88. Therefore, the user interaction module 106 may be triggered to obtain an input from the user. For example, the user may provide the missing information, which may improve the confidence score of one or more of the program candidates to be above the threshold. As another example, the user may determine the correct programs from the program candidates rather than providing a groundtruth program, which may demonstrate an advantage of considering multiple programs. In some embodiments, the confidence evaluations may provide one confidence score for each program candidate, and confidence score of each operation in a program may provide information for debugging.

Figure 9A:
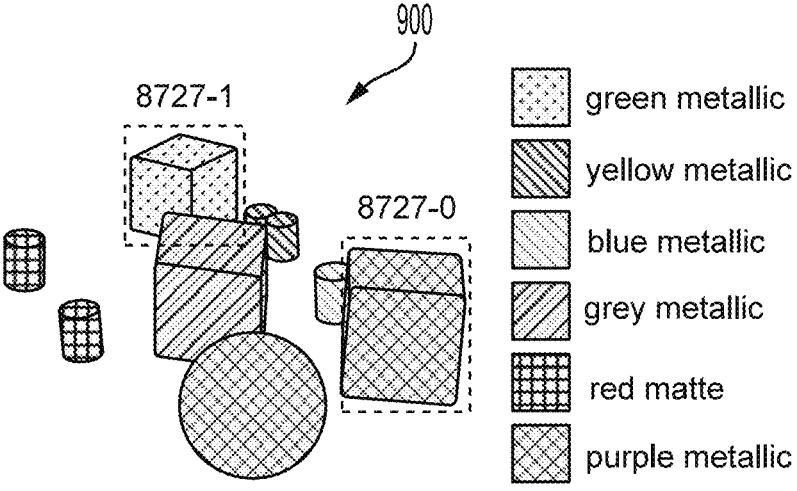

FIGS. 9A-9C illustrate an example of interactable visual question answering, according to embodiments of the present disclosure. In particular, FIG. 9A illustrates an example of an input image, FIG. 9B illustrates an example of an output of a scene perception module, and FIG. 9C illustrates an example of a program candidates including a selected program.

FIGS. 9A-9C relate to an example in which a low confidence score is calculated for a concept by the scene perception module 102 and a low confidence score is calculated for program candidates by the question parsing module 104. As shown in FIG. 9A, an input image 900 may include bounding boxes and labels for objects 8727-1 and 8727-0.

As shown in FIG. 9B, the scene perception module 102 may generate a prediction for object 8727-1 which results in a low confidence score of 0.5815 for the concept "Cylinder" corresponding to the shape attribute of object 8727-1, and a prediction for object 8727-0 which results in a confidence score of 0.9543 for the concept "Cube" corresponding to the shape attribute of object 8727-0. For example, the confidence scores for the concept "Cylinder" corresponding to the shape attribute of object 8727-1 may be below one or more confidence thresholds, for example a threshold of 0.94.

Therefore, the CBNS system 100 may request user interaction after the scene perception module 102 performs the scene perception in order to correct the predictions and improve confidence. The user interaction module 106 may obtain an input from a user which indicates the concept "Cube" for the shape attribute of the object 8727-1. In addition, the user interaction module 106 may obtain an input from the user which confirms the concept "Cube" for the shape attribute of object 8727-0. Accordingly, the CBNS system 100 may update the concept of the shape attribute of the object 8727-1 to be "Cube", and may confirm the concept of the shape attribute of the object 8727-0 to be "Cube", and may set a corresponding confidence score for both of these concepts to 1.

As shown in FIG. 9C, program candidates Candidate 1, Candidate 2, and Candidate 3 may be determined based on an input question of "There is a red cylinder that is in front of the cylinder that is to the left of cylinder right of the tiny red matte cylinder, how big is it?". The confidence scores of one or more of the program candidates may be below one or more confidence thresholds. Therefore, the CBNS system 100 may request user interaction after the question parsing module 102 performs the question parsing in order to correct the program candidates and improve confidence. The user interaction module 106 may obtain an input from a user which indicates that Candidate 2 is missing key information in the question, and that Candidate 3 includes a meaningless operation 11. Accordingly, Candidate 1 may be selected as the selected program.

FIG. 10 is a flowchart illustrating a method of performing visual question answering, according to embodiments of the present disclosure. In embodiments, the method 1000 of FIG. 10 may be performed by or using the at least one of the CBNS system 100 and any of the elements included therein, and any other element described above.

As shown in FIG. 10, at operation S901, the method 1000 may include obtaining an image and a question corresponding to the image.

At operation S1002, the method 1000 may further include generating a plurality of feature predictions about at least one object included in the image by providing the image to an artificial intelligence (AI) scene perception model. In embodiments, the AI scene perception model may correspond to the scene perception module 102 discussed above, and the plurality of feature predictions may correspond to at least one of the attributes and the concepts discussed above.

At operation S1003, the method 1000 may further include generating a plurality of symbolic programs and a plurality of program confidence scores by providing the question to an AI question parsing model, wherein each symbolic program of the plurality of symbolic programs comprises a set of logic operations and is associated with a corresponding program confidence score from among the plurality of program confidence scores. In embodiments, the AI question parsing model may correspond to the question parsing module 104 discussed above.

At operation S1004, the method 1000 may further include selecting a symbolic program associated with a program confidence score which is highest among the plurality of program confidence scores.

At operation S1005, the method 1000 may further include executing the selected symbolic program by performing the set of logic operations included in the selected symbolic program on the plurality of feature predictions.

At operation S1006, the method 1000 may further include. In embodiments, determining a natural language answer to the question based on a result of the set of logic operations.

In embodiments, the image and the question may be received from a user, and the method may further include providing the natural language answer to the user as a response to the question.

In embodiments, the plurality of feature predictions may be associated with a plurality of feature confidence scores generated by the AI scene perception model.

In embodiments, the set of logic operations included in the selected symbolic program may be associated with a plurality of operation confidence scores, and each logic operation of the set of logic operations may be associated with an operation confidence score from among the plurality of operation confidence scores, the operation confidence score being determined based on at least one of the program confidence score and the plurality of feature confidence scores.

In embodiments, based on at least one confidence score of the plurality of program confidence scores, the plurality of feature confidence scores, and the plurality of operation confidence scores being below a threshold value: the method 1000 may further include obtaining user input corresponding to the at least one confidence score; and adjusting the at least one confidence score based on the user input.

In embodiments, the method 1000 may further include determining an answer confidence score corresponding to the natural language answer based on the plurality of operation confidence scores.

In embodiments, the method 1000 may further include generating augmented training data based on the plurality of symbolic programs; and training the AI scene perception model based on the augmented training data.

In embodiments, the generating of the augmented training data may include generating a first ranking of the plurality of symbolic programs based on the plurality of program confidence scores; generating a second ranking of the plurality of symbolic programs based on a plurality of agreement losses between the plurality of program confidence scores and the question; selecting a subset of the plurality of symbolic programs based on the first ranking and the second ranking; and generating the augmented training data based on outputs of the subset of the plurality of symbolic programs.

As a result, embodiments may provide improved answer accuracy. For example, the question parser architecture, confidence evaluation, and training method provided by embodiments may increase both the question parser and entire system performance significantly. Embodiments may further provide uncertainty quantification and confidence evaluations: For example the confidence score according to embodiments may effectively predict the correctness of the inference result. Embodiments may further provide reduced computation costs: For example, by applying a data augmentation method according to embodiments, the data and computation intensive REINFORCE method may be avoided while achieving similar or even increased performance based on limited training data.

Accordingly, embodiments may provide improved systems for performing tasks such as VQA or other information retrieval tasks. For example, for safety-critical applications, confidence evaluations provided by embodiments may be used to determine whether to take the actions provided by machines. For error analysis of a complex process, the confidence evaluations of each step provided by embodiments may be used needed to trace errors. For new data acquisition, uncertainty quantification provided by embodiments may be used to determine the regions that are not well represented by the current dataset. For decision making, multiple reasoning paths provided by embodiments may be used to select the most confident solution. For user interactions, with confidence evaluation enabled according to embodiments, a user may efficiently provide limited rectification to the system based on the estimated confidence. In addition, embodiments may be applied to devices such as augmented-reality or smart glasses to help visually-impaired patient better "visualize" the environment through a question-answering approach.

Figure 11:
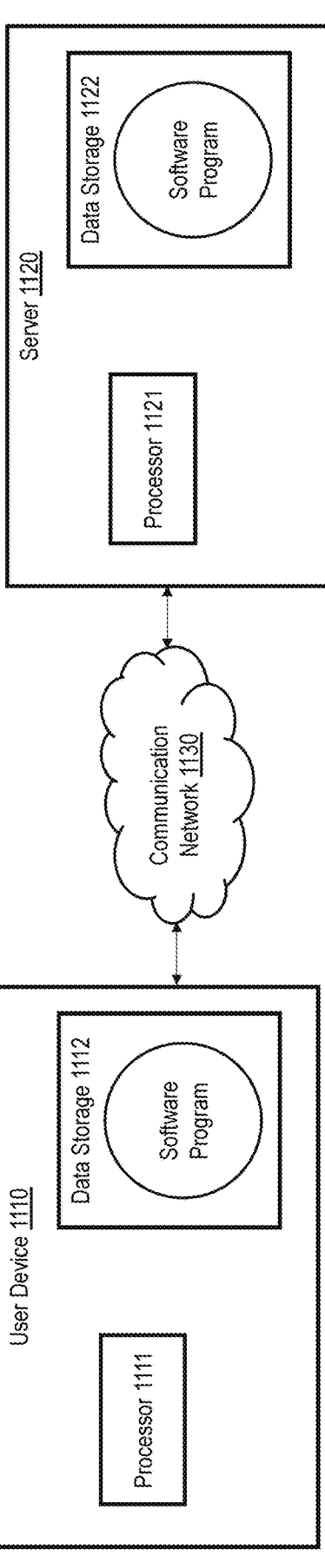
FIG. 11 is a diagram of electronic devices for performing a multimodal retrieval task according to embodiments of the present disclosure.

FIG. 11 is a diagram of devices for performing an interactable CBNS VQA task according to embodiments. FIG. 11 includes a user device 1110, a server 1120, and a communication network 1130. The user device 1110 and the server 1120 may interconnect via wired connections, wireless connections, or a combination of wired and wireless connections.

The user device 1110 includes one or more devices (e.g., a processor 1111 and a data storage 1112) configured to retrieve an image corresponding to a search query. For example, the user device 1110 may include a computing device (e.g., a desktop computer, a laptop computer, a tablet computer, a handheld computer, a smart speaker, a server, etc.), a mobile phone (e.g., a smart phone, a radiotelephone, etc.), a camera device, a wearable device (e.g., a pair of smart glasses, a smart watch, etc.), a home appliance (e.g., a robot vacuum cleaner, a smart refrigerator, etc.), or a similar device. The data storage 1112 of the user device 1110 may include one or more of the scene perception module 102, the question parsing module 104, the user interaction module 106, and the program execution module 108. Alternatively, the user device 1110 stores one or more of the scene perception module 102, the question parsing module 104, the user interaction module 106, and the program execution module 108, or vice versa.

The server 1120 includes one or more devices (e.g., a processor 1121 and a data storage 1122) configured to one or more of the scene perception module 102, the question parsing module 104, the user interaction module 106, and the program execution module 108. The data storage 1122 of the server 1120 may include one or more of the scene perception module 102, the question parsing module 104, the user interaction module 106, and the program execution module 108. Alternatively, the user device 1110 stores the one or more of the scene perception module 102, the question parsing module 104, the user interaction module 106, and the program execution module 108, or vice versa.

The communication network 1130 includes one or more wired and/or wireless networks. For example, network 1300 may include a cellular network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 11 are provided as an example. In practice, there may be additional devices and/or networks, fewer devices and/or networks, different devices and/or networks, or differently arranged devices and/or networks than those shown in FIG. 11. Furthermore, two or more devices shown in FIG. 11 may be implemented within a single device, or a single device shown in FIG. 11 may be implemented as multiple, distributed devices. Additionally, or alternatively, a set of devices (e.g., one or more devices) may perform one or more functions described as being performed by another set of devices.

FIG. 12 is a diagram of components of one or more electronic devices of FIG. 11 according to an embodiment. An electronic device 1200 in FIG. 12 may correspond to the user device 1110 and/or the server 1120.

FIG. 12 is for illustration only, and other embodiments of the electronic device 1200 could be used without departing from the scope of this disclosure. For example, the electronic device 1200 may correspond to a client device or a server.

The electronic device 1200 includes a bus 1210, a processor 1220, a memory 1230, an interface 1240, and a display 1250.

The bus 1210 includes a circuit for connecting the components 1220 to 1250 with one another. The bus 1210 functions as a communication system for transferring data between the components 1220 to 1250 or between electronic devices.

The processor 1220 includes one or more of a central processing unit (CPU), a graphics processor unit (GPU), an accelerated processing unit (APU), a many integrated core (MIC), a field-programmable gate array (FPGA), or a digital signal processor (DSP). The processor 1220 is able to perform control of any one or any combination of the other components of the electronic device 1200, and/or perform an operation or data processing relating to communication. For example, the processor 1220 may perform the methods 200, 400B, and 1000, and methods corresponding to frameworks 400A, 500A, and 500B, as illustrated in FIGS. 2, 4A-4B, 5A-5B, and 10. The processor 1220 executes one or more programs stored in the memory 1230.

The memory 1230 may include a volatile and/or nonvolatile memory. The memory 1230 stores information, such as one or more of commands, data, programs (one or more instructions), applications 1234, etc., which are related to at least one other component of the electronic device 1200 and for driving and controlling the electronic device 1200. For example, commands and/or data may formulate an operating system (OS) 1232. Information stored in the memory 1230 may be executed by the processor 1220.

The applications 1234 include the above-discussed embodiments. These functions can be performed by a single application or by multiple applications that each carry out one or more of these functions. For example, the applications 1234 may include an artificial intelligence (AI) model for performing the methods 200, 400B, and 1000, and methods corresponding to frameworks 400A, 500A, and 500B, as illustrated in FIGS. 2, 4A-4B, 5A-5B, and 10.

The display 1250 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 1250 can also be a depth-aware display, such as a multi-focal display. The display 1250 is able to present, for example, various contents, such as text, images, videos, icons, and symbols.

The interface 1240 includes input/output (I/O) interface 1242, communication interface 1244, and/or one or more sensors 1246. The I/O interface 1242 serves as an interface that can, for example, transfer commands and/or data between a user and/or other external devices and other component(s) of the electronic device 1200.

The communication interface 1244 may enable communication between the electronic device 1200 and other external devices, via a wired connection, a wireless connection, or a combination of wired and wireless connections. The communication interface 1244 may permit the electronic device 1200 to receive information from another device and/or provide information to another device. For example, the communication interface 1244 may include an Ethernet interface, an optical interface, a coaxial interface, an infrared interface, a radio frequency (RF) interface, a universal serial bus (USB) interface, a Wi-Fi interface, a cellular network interface, or the like. The communication interface 1244 may receive videos and/or video frames from an external device, such as a server.

The sensor(s) 1246 of the interface 1240 can meter a physical quantity or detect an activation state of the electronic device 1200 and convert metered or detected information into an electrical signal. For example, the sensor(s) 1246 can include one or more cameras or other imaging sensors for capturing images of scenes. The sensor(s) 1246 can also include any one or any combination of a microphone, a keyboard, a mouse, and one or more buttons for touch input. The sensor(s) 1246 can further include an inertial measurement unit. In addition, the sensor(s) 1246 can include a control circuit for controlling at least one of the sensors included herein. Any of these sensor(s) 1246 can be located within or coupled to the electronic device 1200. The sensor(s) 1246 may receive a text and/or a voice signal that contains one or more queries.

The interactable CBNS VQA process may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to electronic device 1200, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

The interactable CBNS VQA process may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server or a storage medium of server 106.

The foregoing disclosure provides illustration and description, but is not intended to be exhaustive or to limit the implementation to the precise form disclosed. Modifications and variations are possible in light of the above disclosure or may be acquired from practice of the implementation.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

A model related to the neural networks described above may be implemented via a software module. When the model is implemented via a software module (for example, a program module including instructions), the model may be stored in a computer-readable recording medium.

Also, the model may be a part of the electronic device 1000 described above by being integrated in a form of a hardware chip. For example, the model may be manufactured in a form of a dedicated hardware chip for artificial intelligence, or may be manufactured as a part of an existing general-purpose processor (for example, a CPU or application processor) or a graphic-dedicated processor (for example a GPU).

Also, the model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. A method of performing visual question answering (VQA), the method comprising:

obtaining an image and a question corresponding to the image;

generating a plurality of feature predictions about at least one object included in the image by providing the image to an artificial intelligence (AI) scene perception model;

generating a plurality of symbolic programs and a plurality of program confidence scores by providing the question to an AI question parsing model, wherein each symbolic program of the plurality of symbolic programs comprises a set of logic operations and is associated with a corresponding program confidence score from among the plurality of program confidence scores;

selecting a symbolic program associated with a program confidence score which is highest among the plurality of program confidence scores;

executing the selected symbolic program by performing the set of logic operations included in the selected symbolic program on the plurality of feature predictions; and determining a natural language answer to the question based on a result of the set of logic operations, wherein the set of logic operations included in the selected symbolic program is associated with a plurality of operation confidence scores, and wherein each logic operation of the set of logic operations is associated with an operation confidence score from among the plurality of operation confidence scores.

2. The method of claim 1, wherein the image and the question are received from a user, and wherein the method further comprises providing the natural language answer to the user as a response to the question.

3. The method of claim 1, wherein the plurality of feature predictions is associated with a plurality of feature confidence scores generated by the AI scene perception model.

4. The method of claim 3, wherein the operation confidence score corresponding to each logic operation of the set of logic operations is determined based on at least one of the program confidence score and the plurality of feature confidence scores.

5. The method of claim 4, further comprising:

based on at least one confidence score of the plurality of program confidence scores, the plurality of feature confidence scores, and the plurality of operation confidence scores being below a threshold value:

obtaining user input corresponding to the at least one confidence score; and adjusting the at least one confidence score based on the user input.

6. The method of claim 4, further comprising determining an answer confidence score corresponding to the natural language answer based on the plurality of operation confidence scores.

7. The method of claim 1, further comprising:

generating augmented training data based on the plurality of symbolic programs; and training the AI scene perception model based on the augmented training data.

8. The method of claim 7, wherein the generating of the augmented training data comprises:

generating a first ranking of the plurality of symbolic programs based on the plurality of program confidence scores;

generating a second ranking of the plurality of symbolic programs based on a plurality of agreement losses between the plurality of program confidence scores and the question;

selecting a subset of the plurality of symbolic programs based on the first ranking and the second ranking; and generating the augmented training data based on outputs of the subset of the plurality of symbolic programs.

9. An apparatus for performing visual question answering (VQA), the apparatus comprising:

a memory configured to store instructions; and at least one processor configured to execute the instructions to:

obtain an image and a question corresponding to the image;

generate a plurality of feature predictions about at least one object included in the image by providing the image to an artificial intelligence (AI) scene perception model;

generate a plurality of symbolic programs and a plurality of program confidence scores by providing the question to an AI question parsing model, wherein each symbolic program of the plurality of symbolic programs comprises a set of logic operations and is associated with a corresponding program confidence score from among the plurality of program confidence scores;

select a symbolic program associated with a program confidence score which is highest among the plurality of program confidence scores;

execute the selected symbolic program by performing the set of logic operations included in the selected symbolic program on the plurality of feature predictions; and determine a natural language answer to the question based on a result of the set of logic operations, wherein the set of logic operations included in the selected symbolic program is associated with a plurality of operation confidence scores, and wherein each logic operation of the set of logic operations is associated with an operation confidence score from among the plurality of operation confidence scores.

10. The apparatus of claim 9, wherein the image and the question are received from a user, and wherein the at least one processor is further configured to execute the instructions to provide the natural language answer to the user as a response to the question.

11. The apparatus of claim 9, wherein the plurality of feature predictions is associated with a plurality of feature confidence scores generated by the AI scene perception model.

12. The apparatus of claim 11, wherein the operation confidence score corresponding to each logic operation of the set of logic operations is determined based on at least one of the program confidence score and the plurality of feature confidence scores.

13. The apparatus of claim 12, wherein the at least one processor is further configured to execute the instructions to:

based on at least one confidence score of the plurality of program confidence scores, the plurality of feature confidence scores, and the plurality of operation confidence scores being below a threshold value:

obtain user input corresponding to the at least one confidence score; and adjust the at least one confidence score based on the user input.

14. The apparatus of claim 12, wherein the at least one processor is further configured to execute the instructions to determine an answer confidence score corresponding to the natural language answer based on the plurality of operation confidence scores.

15. The apparatus of claim 9, wherein the at least one processor is further configured to execute the instructions to:

generate augmented training data based on the plurality of symbolic programs; and train the AI scene perception model based on the augmented training data.

16. The apparatus of claim 15, wherein to generate the augmented training data, the at least one processor is further configured to:

generate a first ranking of the plurality of symbolic programs based on the plurality of program confidence scores;

generate a second ranking of the plurality of symbolic programs based on a plurality of agreement losses between the plurality of program confidence scores and the question;

select a subset of the plurality of symbolic programs based on the first ranking and the second ranking; and generate the augmented training data based on outputs of the subset of the plurality of symbolic programs.

17. A non-transitory computer readable medium storing instructions which, when executed by at least one processor of a device for performing visual question answering (VQA), cause the at least one processor to:

obtain an image and a question corresponding to the image;

generate a plurality of feature predictions about at least one object included in the image by providing the image to an artificial intelligence (AI) scene perception model;

generate a plurality of symbolic programs and a plurality of program confidence scores by providing the question to an AI question parsing model, wherein each symbolic program of the plurality of symbolic programs comprises a set of logic operations and is associated with a corresponding program confidence score from among the plurality of program confidence scores;

select a symbolic program associated with a program confidence score which is highest among the plurality of program confidence scores;

execute the selected symbolic program by performing the set of logic operations included in the selected symbolic program on the plurality of feature predictions; and determine a natural language answer to the question based on a result of the set of logic operations, wherein the set of logic operations included in the selected symbolic program is associated with a plurality of operation confidence scores, and wherein each logic operation of the set of logic operations is associated with an operation confidence score from among the plurality of operation confidence scores.

18. The non-transitory computer readable medium of claim 17, wherein the plurality of feature predictions is associated with a plurality of feature confidence scores generated by the AI scene perception model.

19. The non-transitory computer readable medium of claim 18, wherein the operation confidence score corresponding to each logic operation of the set of logic operations is determined based on at least one of the program confidence score and the plurality of feature confidence scores.

20. The non-transitory computer readable medium of claim 19, wherein the instructions are further configured to cause the at least one processor to:

based on at least one confidence score of the plurality of program confidence scores, the plurality of feature confidence scores, and the plurality of operation confidence scores being below a threshold value:

obtain user input corresponding to the at least one confidence score; and adjust the at least one confidence score based on the user input.

\* \* \* \* \*